US010471953B1

United States Patent
Askeland

(10) Patent No.: US 10,471,953 B1
(45) Date of Patent: Nov. 12, 2019

(54) OCCUPANT AWARE BRAKING SYSTEM

(71) Applicant: Zoox, Inc., Foster City, CA (US)

(72) Inventor: Jacob Lee Askeland, San Jose, CA (US)

(73) Assignee: Zoox, Inc., Foster City, CA (US)

(*) Notice: Subject to any disclaimer, the term of this patent is extended or adjusted under 35 U.S.C. 154(b) by 0 days.

(21) Appl. No.: 16/051,116

(22) Filed: Jul. 31, 2018

Related U.S. Application Data

(63) Continuation of application No. 15/437,677, filed on Feb. 21, 2017, now Pat. No. 10,053,088.

(51) Int. Cl.
| | |
|---|---|
| *B60W 30/02* | (2012.01) |
| *B60W 40/109* | (2012.01) |
| *B60W 40/107* | (2012.01) |
| *B60W 40/08* | (2012.01) |
| *H04N 7/18* | (2006.01) |
| *G06K 9/00* | (2006.01) |
| *G06K 9/62* | (2006.01) |
| *B60N 2/00* | (2006.01) |
| *B60R 22/48* | (2006.01) |
| *B60T 7/22* | (2006.01) |

(52) U.S. Cl.
CPC ........... *B60W 30/025* (2013.01); *B60N 2/002* (2013.01); *B60R 22/48* (2013.01); *B60T 7/22* (2013.01); *B60W 40/08* (2013.01); *B60W 40/107* (2013.01); *B60W 40/109* (2013.01); *G06K 9/00832* (2013.01); *G06K 9/6267* (2013.01); *H04N 7/183* (2013.01); *B60R 2022/4816* (2013.01); *B60R 2022/4858* (2013.01); *B60T 2210/30* (2013.01); *B60W 2040/0881* (2013.01)

(58) Field of Classification Search
CPC ... B60W 2040/0881; B60W 2720/106; B60W 2720/125; B60W 30/025; B60W 30/18; B60W 40/08; B60W 40/107; B60W 40/109; B60W 50/085; B60K 28/08; B60K 31/0008; B60N 2/002
See application file for complete search history.

(56) References Cited

U.S. PATENT DOCUMENTS 5,777,451 A * 7/1998 Kobayashi .............. B61L 23/34
180/169
5,983,147 A 11/1999 Krumm
(Continued)

*Primary Examiner* — Tyler J Lee
(74) *Attorney, Agent, or Firm* — Lee & Hayes, P.C.

(57) ABSTRACT

A vehicle control system includes variable maneuvering limits based at least in part on whether the vehicle is carrying cargo (i.e., passengers or other cargo). The system can include a cargo classification system comprising one or more internal sensors, an imager, and an image interpreter. The cargo classification system can determine if the vehicle is carrying cargo and classify the cargo (e.g., passengers or other cargo). Based at least in part on this classification, the vehicle control system can set various vehicle maneuvering limits. When the vehicle is empty, the vehicle control system can maneuver the vehicle at, or near, the actual maneuvering limits for the vehicle (e.g., maximum longitudinal acceleration, braking and lateral acceleration that can be generated by the vehicle). When the vehicle is carrying cargo, the vehicle control system can maneuver the vehicle at a lower threshold to prevent passenger discomfort and/or cargo damage or discomfort.

20 Claims, 9 Drawing Sheets

(56) References Cited

U.S. PATENT DOCUMENTS

| | | | |
|---|---|---|---|
| 6,032,097 A * | 2/2000 | Iihoshi | G05D 1/0293 701/96 |
| 6,801,662 B1 | 10/2004 | Owechko et al. | |
| 7,472,007 B2 | 12/2008 | Kong et al. | |
| 8,660,779 B2 * | 2/2014 | Shida | B60W 30/16 701/117 |
| 9,202,379 B2 * | 12/2015 | Yamashiro | G08G 1/22 |
| 9,963,106 B1 | 5/2018 | Ricci | |
| 10,017,039 B1 * | 7/2018 | Colavincenzo | B60K 6/22 |
| 10,216,195 B2 * | 2/2019 | Switkes | G01G 19/086 |
| 10,254,764 B2 * | 4/2019 | Laubinger | G05D 1/0272 |
| 2004/0045758 A1 | 3/2004 | Breed et al. | |
| 2004/0220705 A1 | 11/2004 | Basir et al. | |
| 2005/0185846 A1 | 8/2005 | Luo et al. | |
| 2007/0055428 A1 | 3/2007 | Kong et al. | |
| 2008/0189053 A1 | 8/2008 | Breed et al. | |
| 2011/0010056 A1 | 1/2011 | Inayoshi et al. | |
| 2011/0270514 A1 * | 11/2011 | Shida | B60W 30/16 701/117 |
| 2013/0024075 A1 | 1/2013 | Zagorski et al. | |
| 2013/0076499 A1 | 3/2013 | Okita | |
| 2013/0204457 A1 | 8/2013 | King et al. | |
| 2014/0107867 A1 * | 4/2014 | Yamashiro | G08G 1/22 701/2 |
| 2014/0379247 A1 | 12/2014 | Ferguson et al. | |
| 2015/0161881 A1 | 6/2015 | Takemura et al. | |
| 2015/0210279 A1 | 7/2015 | Agnew et al. | |
| 2016/0297432 A1 | 10/2016 | Fletcher et al. | |
| 2017/0001639 A1 | 1/2017 | Dempsey et al. | |
| 2017/0175431 A1 | 6/2017 | Bradley et al. | |
| 2017/0217445 A1 | 8/2017 | Tzirkel-Hancock et al. | |
| 2017/0327082 A1 | 11/2017 | Kamhi et al. | |
| 2017/0329329 A1 | 11/2017 | Kamhi et al. | |
| 2017/0349184 A1 | 12/2017 | Tzirkel-Hancock et al. | |
| 2017/0352267 A1 | 12/2017 | Tzirkel-Hancock et al. | |
| 2017/0371339 A1 | 12/2017 | Charette et al. | |
| 2018/0074495 A1 | 3/2018 | Myers et al. | |
| 2018/0120861 A1 * | 5/2018 | Saxena | G05D 1/0088 |
| 2018/0126951 A1 | 5/2018 | Ricci | |
| 2018/0127001 A1 | 5/2018 | Ricci | |
| 2018/0129204 A1 | 5/2018 | Ricci et al. | |
| 2018/0130347 A1 | 5/2018 | Ricci et al. | |
| 2018/0134263 A1 | 5/2018 | Edinger et al. | |
| 2018/0141562 A1 | 5/2018 | Singhal | |

* cited by examiner

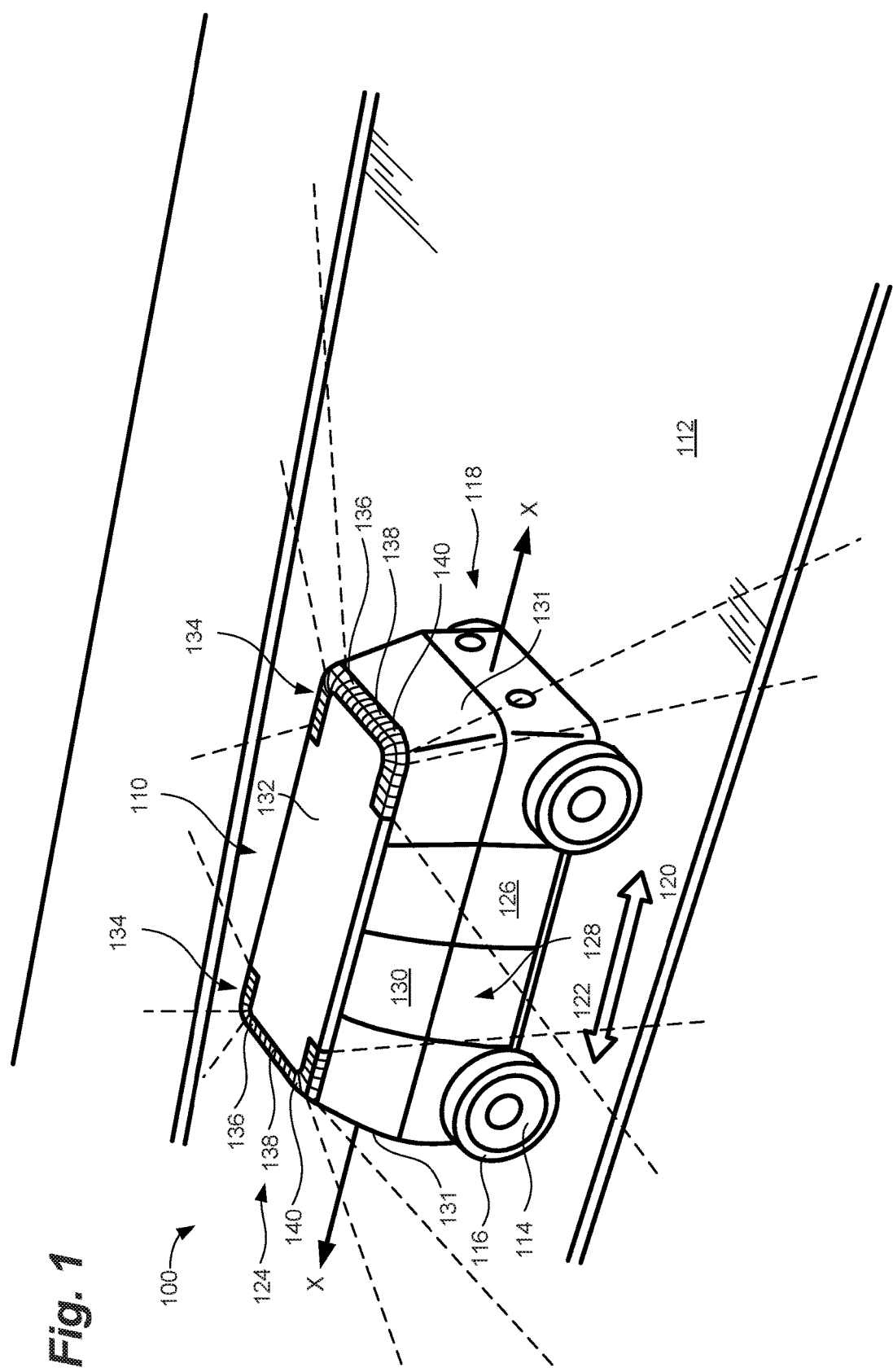

OCCUPANT AWARE BRAKING SYSTEM

CROSS REFERENCE TO RELATED APPLICATIONS

This disclosure is a continuation of, and claims priority under 35 U.S.C. § 120 to, U.S. patent application Ser. No. 15/437,677, filed Feb. 21, 2017, of the same title, which is incorporated herein by reference as if fully set forth below.

BACKGROUND

The performance of a road-going vehicle is limited, in part, by the level of traction between tires of the vehicle and the road surface on which the vehicle travels. All other parameters being equal, with more traction, a vehicle can accelerate, change direction, and stop more quickly. Traction between the tires and the road surface is directly proportional to the friction between the tires and the road surface, which, in turn, is directly proportional to the coefficient of friction between the tires and the road surface. The coefficient of friction is largely a function of characteristics of the material and tread of the tires and characteristics of the road surface, such as, for example, the material and texture of the road surface and any coating on the road surface, such as, for example, dirt, oil, water, snow, or ice.

Aside from purely mechanical limitations, however, vehicle acceleration may also be intentionally limited for occupant comfort and safety. Modern fighter jets, for example, can maneuver at acceleration high enough to cause pilots to lose consciousness and even to cause pilot injury or death. Thus, while a pilot may call for maximum lateral acceleration during a dogfight, for example, the acceleration of the plane is generally computer-limited to acceleration levels that can be tolerated by the pilot (i.e., as opposed to being governed by the structural limits of the aircraft). Airliners and cruise ships, on the other hand, generally maneuver as slowly and smoothly as possible to avoid causing passenger discomfort and motion sickness, among other things. Similarly, current autonomous emergency braking systems and adaptive cruise control systems are limited to around 9 m/s$^2$ and 4.5 m/s$^2$, respectively, of acceleration—e.g., positive, negative (braking), lateral, or a combination thereof—for passenger comfort and safety. This can prevent passengers from being unnecessarily thrown about the interior of the vehicle or experiencing motion sickness, among other things.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 1 is a perspective view of an example of a vehicle including an illustrative sensor array, in accordance with some examples of the present disclosure.

DETAILED DESCRIPTION

Figure 2A:
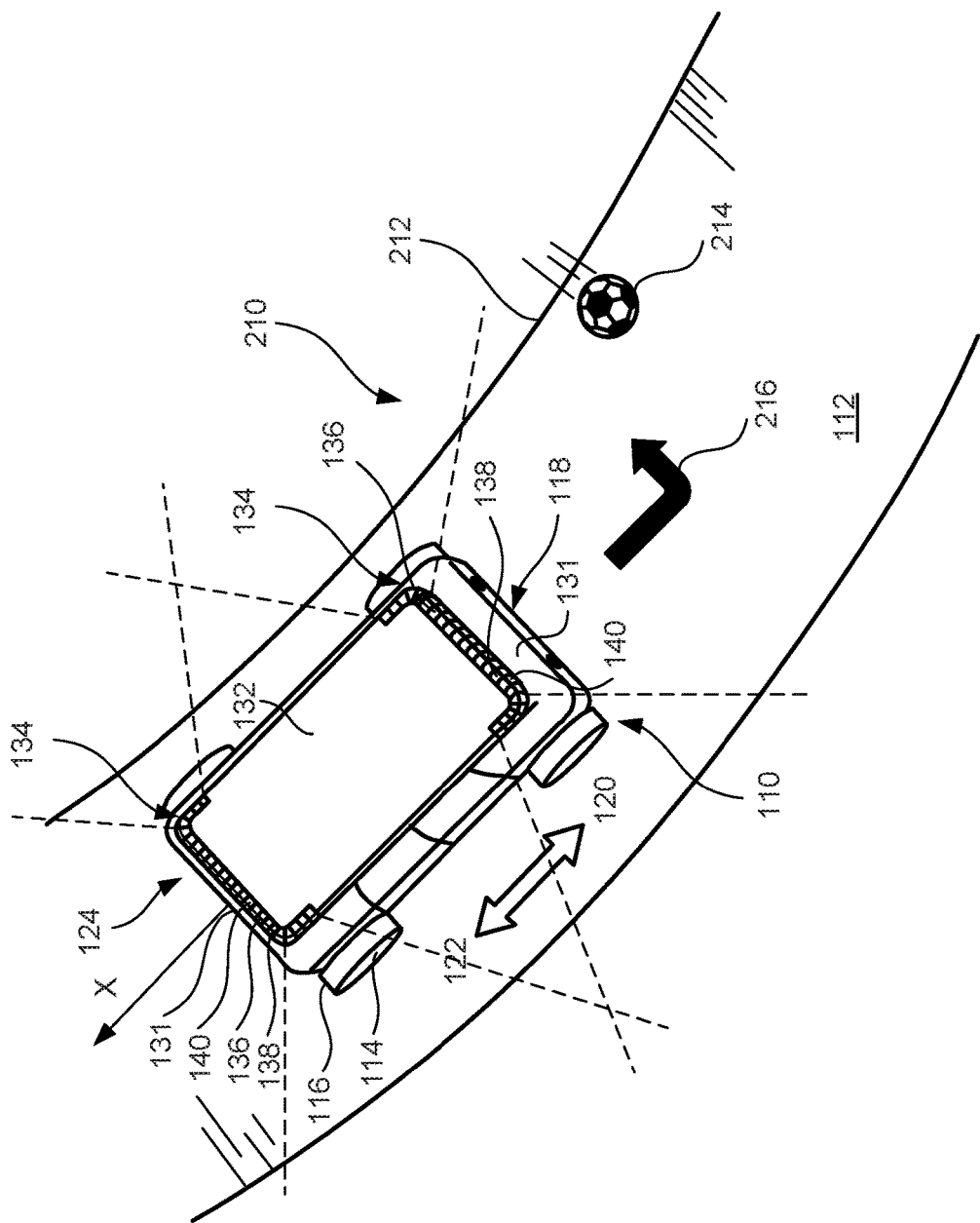
FIG. 2A is an overhead view of the vehicle and sensor array shown in FIG. 1, in accordance with some examples of the present disclosure.

As discussed above, the acceleration of a road-going vehicle when accelerating, turning, and braking is limited, in part, by the level of traction between the tires of the vehicle and the road surface on which the vehicle travels, which is directly proportional to the friction between the tires and the road surface. In general, however, for a variety of reasons, vehicles are rarely driven at the limits of traction. Constantly accelerating, turning, and braking at the limits of traction for the vehicle may result in inefficient energy consumption (e.g., poor gas mileage or battery life), high component wear, and passenger discomfort, among other things.

In addition, maneuvering at the limits of vehicle capability leaves no margin for dealing with unexpected road conditions. In other words, the traction available between the vehicle and the road can be used to generate forces for accelerating, turning, and braking, but combined, these forces cannot exceed the total amount of force available from traction without a possible loss of control. Thus, a vehicle maneuvering around a corner from one road to another at its maximum lateral acceleration (e.g., 0.9 "Gs" or 0.9 times the acceleration of gravity), for example, has no traction left in reserve for braking when a pedestrian is suddenly detected in its path. In this scenario, the vehicle may be unable to avoid the pedestrian because it cannot stop (i.e., all available traction is already being used to turn the vehicle) and it cannot turn more sharply without sliding, for example, or locking the wheels.

With respect to autonomous vehicles, however, it may be desirable to set different maneuvering limits based on whether the vehicle is carrying cargo (e.g., is occupied with passengers or carrying other cargo) or not. For example, an unoccupied vehicle may be capable of braking and maneuvering at higher limits to avoid an accident or obstacle, for example, without fear of injuring the occupants. Additionally, or in the alternative, what passengers find to be a comfortable level of acceleration may be so far below the mechanical capabilities of the vehicle, that the vehicle can be driven closer to the limit when unoccupied without causing undue wear and tear on the vehicle. Thus, an autonomous vehicle may have at least two sets of maneuvering rules: one set of rules governing maximum acceleration rates when carrying cargo (whether passengers or other cargo) and another set of rules governing maximum acceleration rates when empty. Indeed, the autonomous vehicle may also have multiple rules based on the classification of the cargo. In other words, if the vehicle is delivering something that is essentially unbreakable (e.g., hammers or an envelope filled with paper), then the vehicle can brake as hard as is mechanically possible without fear of damaging the cargo. Of course, if the cargo is hammers, then some consideration may be given as to whether maximum braking will cause the cargo to damage the vehicle (e.g., the interior). If the cargo is a person or a vase, on the other hand, the vehicle may set lower accelerations thresholds to prevent injury or damage, respectively.

This disclosure is generally directed to systems and methods for determining whether an autonomous vehicle is occupied and maneuvering appropriately based on that determination. In some examples, the systems and methods can also include a classification system to further adjust maneuvering limits. The systems and methods described herein may be used to assist with operation of an autonomous vehicle including, but not limited to, vehicles for use on the ground, water, and in the air, or combinations thereof (e.g., amphibious vehicles). In other words, while ships do not brake per se, for example, maneuvering limits can nonetheless be set to maintain passenger comfort, prevent damage to cargo, etc. The systems and methods may be incorporated into partially or fully autonomous vehicles (i.e., vehicles that require limited or no driver control or attention) and can automatically alter the vehicle control systems depending on whether the vehicle is carrying cargo, what the cargo is, and localization and perception algorithms, among other things. In some examples, passengers and/or drivers may be able to set individual maneuvering limits based on personal preferences, physical limitations, or other factors.

In some examples, the systems may include an exterior sensor array including a plurality of exterior sensors associated with the vehicle. The exterior sensors may be oriented relative to the vehicle to obtain images, radio detection and ranging (RADAR), light detection and ranging (LIDAR), and other sensor data of the area in which the vehicle travels and potential objects or obstructions proximate the vehicle. The vehicle can also include one or more interior sensors to detect the presence of, and/or classify, various types of cargo (including passengers) in the vehicle. The interior sensor data and exterior sensor data (collectively, "vehicle sensor data") may be used by a vehicle control system of the autonomous vehicle to assist with altering one or more operations of vehicle travel, such as, for example, acceleration (e.g., lateral and longitudinal) and deceleration via conventional and/or regenerative braking. According to some examples, the vehicle sensor data may be used to assist with altering operation of vehicle safety systems configured to protect objects outside the vehicle from collisions with the vehicle and/or to protect occupants inside the vehicle from collisions (e.g., air bags and seat belt tensioners).

In some examples, the systems and methods may include and/or access an events module configured to update a correlation between the various external sensors. As discussed above, the vehicle may include, for example, RADAR, LIDAR, ultrasonic, cameras, and other sensors configured to detect objects or obstructions near the vehicle. The events module may update or provide input to other vehicle systems to update the correlations between the data from the various sensors. Thus, a RADAR sensor may sense an object in the direct path of the vehicle, for example, while the object is not detected by the LIDAR or cameras. In this case, vehicle systems may choose to ignore the RADAR sensor due to the lack of correlation between the RADAR sensor and the other sensors. This may result in improvements in the accuracy of the correlations. In some examples, the systems and methods may include and/or access a location module configured to receive location data associated with the location and/or orientation of the vehicle and update the correlation between the location data and the vehicle sensor data based, at least in part, on the location data.

Some examples of the systems and methods may include and/or use a reporting module in communication with a network. The reporting module may be configured to communicate data correlating a location and/or orientation of the vehicle with the vehicle sensor data related to detected objects or obstructions via the network. Each vehicle may share the correlations with servers, vehicles, and/or or other computing devices in communication with the network, for example, to provide updates about detected objects or obstructions and their corresponding locations. This may be used to supplement vehicle sensor data for one or more additional vehicles in communication with the vehicle and/or the network. In some examples, as discussed below, this can enable the use of "platooning," or operating vehicles in a convoy very close together, among other things.

In some examples, the systems and methods may include and/or access a receiver module in communication with a network and configured to receive updates relating to the correlation between the vehicle sensor data and location data. For example, vehicles similar to those mentioned previously may communicate information to the vehicle including the receiver module and/or to a network in communication with the receiver module, so that the correlations associated with the vehicle may be updated. This may improve the accuracy of the correlations. As discussed below with reference to FIG. 2B, data from nearby vehicles related to maximum acceleration cargo, and other information may be used when platooning, for example, to set vehicle's locations in the platoon. In other words, the vehicle with the minimum acceleration threshold may not be placed at the back of a platoon, for example, to avoid rear-ending vehicles with higher acceleration thresholds.

The techniques and systems described herein may be implemented in a number of ways. Example implementations are provided below with reference to the following figures.

FIGS. 1 and 2 show an example of an automated vehicle system 100 configured to travel across an area 112 (e.g., a road surface), for example, to transport people and/or cargo from a first location to a second location. For the purpose of illustration, the system 100 can comprise a vehicle 110, which may be an autonomous vehicle configured to operate according to a Level 5 classification issued in 2016 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. As discussed below, in some cases, when occupied, the system may limit acceleration based on passenger preferences, for example, for one or more passengers in the vehicle.

The example vehicle 110 shown in FIGS. 1 and 2 is an automobile having four wheels 114 and respective tires 116 for each of the wheels 114. Other types and configurations of vehicles are contemplated, such as, for example, vans, sport utility vehicles, crossover vehicles, trucks, buses, agricultural vehicles, and construction vehicles. The vehicle 110 may be powered by one or more internal combustion engines, one or more batteries and electric motors, hydrogen fuel cells, or any combination thereof. In addition, although the example vehicle 110 has four wheels, the systems and methods described herein may be incorporated into vehicles having fewer or a greater number of wheels, tires, and/or tracks. The example vehicle 110 has four-wheel steering and may operate generally with equal performance characteristics in all directions, for example, such that a first end 118 of the vehicle 110 is the front end of the vehicle 110 when traveling in a first direction 120, and such that the first end 118 becomes the rear end of the vehicle 110 when traveling in the opposite, second direction 122, as shown in FIGS. 1 and 2. Similarly, a second end 124 of the vehicle 110 is the front end of the vehicle 110 when traveling in the second direction 122, and such that the second end 124 becomes the rear end of the vehicle 110 when traveling in the opposite, first direction 120. These example characteristics may facilitate greater maneuverability, for example, in small spaces or crowded environments, such as parking lots and urban areas.

The example vehicle 110 shown in FIGS. 1 and 2 includes one or more doors 126 on each side 128 of the vehicle 110 for facilitating entry and exit of occupants and cargo to and from an interior space 130 of the vehicle 110. The systems and methods described herein may be incorporated into vehicles having fewer or a greater number of doors. The vehicle 110 shown in FIGS. 1 and 2 includes a windshield 131 and a roof 132 extending substantially (e.g., almost entirely) between the first end 118 and second end 124 of the vehicle 110. In some examples, the vehicle 110 may not include a windshield. Because the example vehicle 110 is a Level 5 autonomous vehicle, a windshield is not necessary. In some examples, the vehicle 110 may include a windshield 131, however, regardless of whether the vehicle 110 is configured to be autonomous or manually controlled by a driver. In some examples, at least a portion of the roof 132 may include one more solar cells configured to supply electric energy to the vehicle 110 for powering one or more electrically powered systems of the vehicle 110.

In the example shown in FIGS. 1 and 2, the system 100 can comprise a pair of sensor arrays 134, which may include, for example, one or more imagers 136, RADAR sensors 138, and/or LIDAR sensors 140 mounted on the vehicle 110. The sensors 136, 138, 140 of the sensor arrays 134 may be arranged in a predetermined pattern, for example, in order to provide a desired area of coverage of the area 112 proximate the vehicle 110. In some examples, as shown, the sensors 136, 138, 140 can be disposed in a pattern that enables approximately 360-degree coverage around the vehicle 110. This can enable the vehicle 110 to detect objects regardless of which direction 120, 122 the vehicle 110 is traveling. This can also enable the system 100 to detect objects approaching from the sides of the vehicle 110 (e.g., a dog, or other animal, running into the street). Other patterns and arrangements of the sensors 136, 138, 140 are contemplated.

The imagers 136 may be any known types of digital image sensors, digital or analog cameras, and/or digital or analog video cameras. The imagers 136 may be high dynamic range (HDR) cameras, for example, to provide improved accuracy of the images. In some examples, the imagers 136 may include one or more of light-sensitive cameras, range sensors, tomography devices, RADAR, and/or ultra-sonic cameras. Other suitable types of imagers are contemplated. The imagers 136 may be selected to provide two-dimensional (2-D) image data, two and a half-dimensional (2.5d, or depth maps), and/or three-dimensional (3D) image data, image sequences, gray image data, and/or color image data. In some examples, the imagers 136 may be selected to provide depth data, absorption data, and/or reflectance data.

As shown in FIGS. 1 and 2, the example sensor arrays 134 may be mounted to a portion of the vehicle 110 that provides a line-of-site view of a portion of the area 112 around the vehicle 110, with at least a portion of the sensors 136, 138, 140 pointed in the direction of travel. As shown, each example sensor array 134 can be mounted to a portion of the roof 132 approaching the upper edge of a windshield 131. The sensor array 134 may be mounted at a location generally corresponding to the upper edge of the windshield 131, for example, either outside or inside the windshield. In examples in which the sensor array 134 is mounted inside the windshield, any distortion of the images resulting from the windshield may be corrected, for example, via lenses or algorithms configured to correct the image data. If the vehicle 110 were to include two windshields due to being bi-directional (like the example vehicle 110), each sensor array 134 could be mounted at a location generally corresponding to the upper edge of the windshield 131.

Although the example sensor arrays 134 shown are mounted to the roof 132, one or more of the sensor arrays 134 could be mounted to other portions of the vehicle 110. For example, one or more of the sensor arrays 134 could be mounted to the first and/or second end of the vehicle 110, for example, at a location generally corresponding to the location of a bumper of a conventional car. According to some examples, sensor arrays 134 may also be mounted to capture images of the area 112 in the paths of each tire 116, or on each side of the vehicle 110.

According to some examples, one or more of the sensor arrays 134 may be mounted in fixed manner, for example, so that images from the sensor array 134 are taken from a constant orientation relative to the vehicle 110. In such examples, the images would always be taken from the same angle relative to the vehicle 110 in both the vertical and lateral directions.

According to some examples, one or more of the sensor arrays 134 may be mounted such that the orientation (e.g., aim) of the sensors 136, 138, 140 can be changed relative to the vehicle 110 in the vertical and/or lateral direction. For example, as shown in FIG. 2A, the orientation of the sensor array 134 is depicted as being directed slightly laterally relative to the longitudinal axis X toward the inside 210 of the curve 212 defined by the area 112. Such examples may track the curve 212 based on the steering angle of the steering system of the vehicle 110, for example, in a manner similar to headlights that follow steering inputs. Such examples may result in the image data obtained by the sensor array 134 being associated with a portion of the area 112 across which the tires 116 of the vehicle 110 travel during a turning maneuver. This may improve the relevance of the image data obtained by the sensor array 134. In some examples, the sensor array 134 may be configured to change orientation relative to the longitudinal axis X, for example, so that the portion of the area 112 to which one or more of the sensors 136, 138, 140 are aimed is either farther ahead or closer to the vehicle 110. In some examples, the sensor array 134 may be configured to rotate in order to change orientation. For example, if the vehicle 110 is traveling at a higher speed, the sensor array 134 may be aimed farther beyond the front of the vehicle 110, so that there is relatively more time for the vehicle 110 to respond to the image data obtained by the sensor array 134. Conversely, if the vehicle 110 is traveling at a relatively slower speed and/or in a densely populated, or otherwise congested area, the sensor array 134 may be aimed closer to the front of the vehicle 110. In some examples, the sensor array 134 can be mounted to permit one or more of these changes in orientation. In such examples, one or more of the imagers 136 may be configured to alter its focal length, for example, to account for changes in distance between the imagers 136 and the portion of the area 112 at which the imagers 136 are aimed.

As discussed above, the sensor array 134 and other components can be used to detect objects in the path of the vehicle 110. In FIG. 2A, a soccer ball 214 is shown rolling into the area 112. In this case, the vehicle 110 can detect the soccer ball 214 (e.g., with the sensor array 134) and formulate an evasive maneuver 216, if necessary. In some examples, the system can determine that the soccer ball 214 will clear the path of the vehicle 110 prior to its arrival. In other examples, the system can determine that a slight deceleration and/or turn will avoid the soccer ball 214. In still other examples, the system can bring the vehicle 110 to a complete stop prior to arriving at the soccer ball 214. This decision can be made with the assumption that a child chasing the soccer ball 214 may be following close behind and that stopping is the safest course of action. Of course, absent evidence of a person proximate the soccer ball 214, for example, the vehicle 110 may choose cargo safety and/or comfort above the soccer ball 214 and take no action. In other words, running over the soccer ball 214, for example, may be preferable to possibly injuring the passengers in the vehicle 110 (absent extenuating circumstances).

Figure 2B:
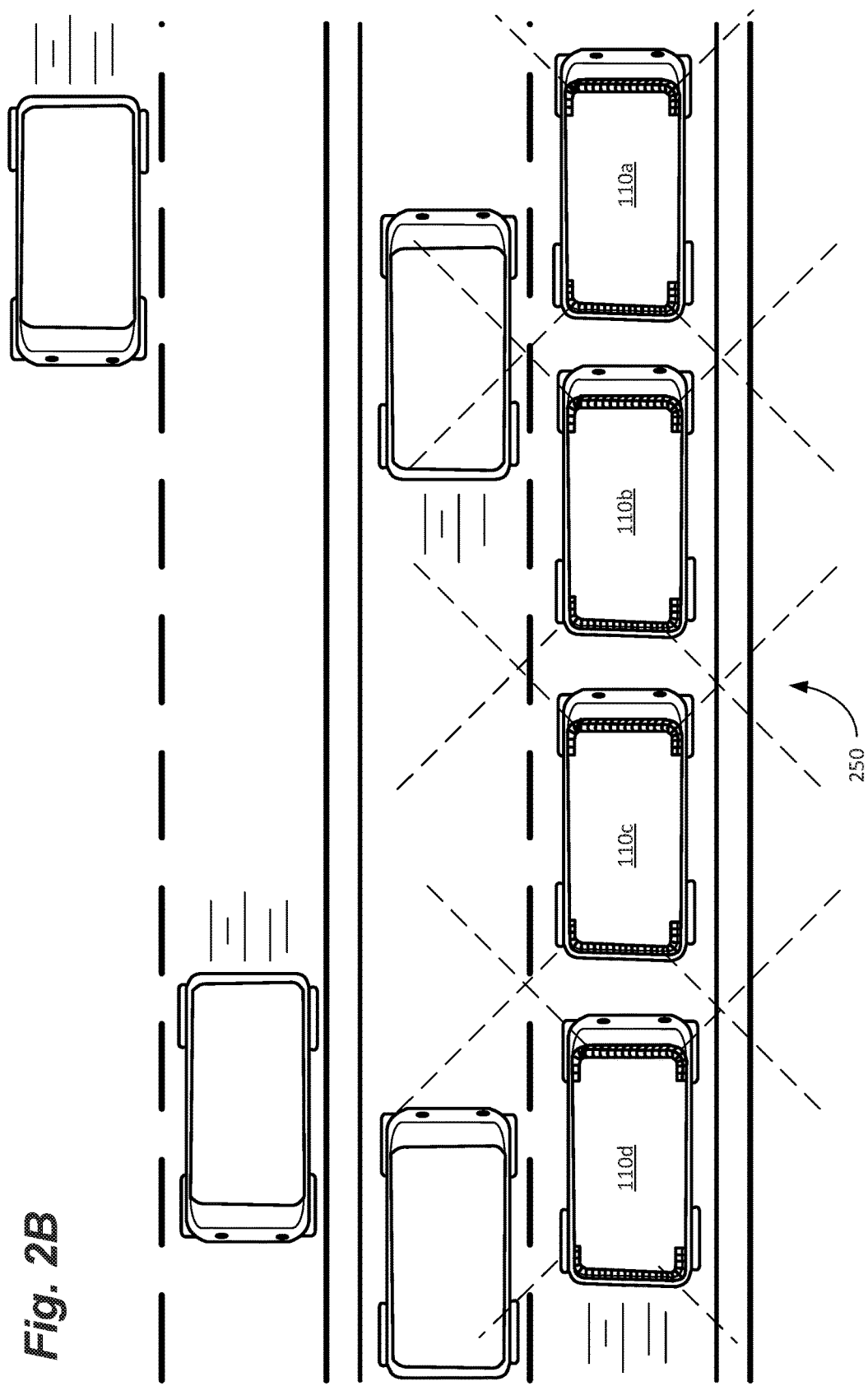
FIG. 2B is an overhead view of a plurality of vehicles platooning, in accordance with some examples of the present disclosure.

As shown in FIG. 2B, in some examples, the system 100 can also be used for "platooning," or controlling multiple autonomous vehicles 110 traveling very close together. This can improve efficiency (e.g., fuel mileage or range), for example, because aerodynamically the vehicles 110 act as a single vehicle 110. Aerodynamic drag is caused primarily by the air having to "open and close" around a vehicle. This is why relatively smooth, teardrop shaped vehicles, for example, are more aerodynamic (i.e., have a lower drag coefficient) that blocky vehicles.

In a platoon 250, the air is forced to "open" around the first vehicle 110a, but does not "close" again until after the fourth vehicle 110d. Thus, the first vehicle 110a does not suffer the aerodynamic drag caused by the air closing behind it. The intermediate vehicles 110b, 110c benefit the most because the air neither opens nor closes around these vehicles 110b, 110c to an appreciable extent. Finally, the last vehicle 110d benefits because it does not have to open the air, only close it. Thus, platooning can result in significant reductions in fuel consumption (up to approximately 20%).

When platooning, the vehicles 110 can be arranged such that the vehicle 110a with a lower maximum acceleration is at the front, the vehicle 110b with the next lowest acceleration can be next, and so on. In FIG. 2B, therefore, the vehicle 110d at the rear is the vehicle that had the highest allowable acceleration. Of course, some or all of the vehicles 110 in the platoon 250 can have the same maximum acceleration.

Thus, when the platoon 250 brakes to avoid an obstacle, for example, the distance between the vehicles 110 will either remain substantially constant or increase. In other words, if the vehicle 110d in the rear has a higher maximum acceleration than the vehicle 110a in the front of the platoon 250, then when the vehicle 110a in the front brakes, the vehicle 110d in the rear can, but does not have to, brake even harder. In a platoon 250 where each vehicle 110 has a progressively higher maximum acceleration from front to back, therefore, the distance between each vehicle 110 can increase during a braking event (assuming that each vehicle 110 brakes at its maximum acceleration).

In some examples, the vehicles 110 can include onboard algorithms for platooning. In this configuration, the vehicles 110 can communicate with one another and receive each vehicle's maximum acceleration. In some examples, the maximum acceleration can be a function of the mechanical limitations of the vehicle 110. As mentioned above, a vehicle's ability to accelerate, decelerate, turn, and otherwise maneuver may be limited to the available traction in a particular situation. To this end, one vehicle 110 may have larger brakes or tires, a more sophisticate suspension system, or other factors that enable it to out brake or otherwise outmaneuver another vehicle 110 in the platoon. In this case, the maximum acceleration may be a function of the vehicle 110 itself. In other examples, as discussed below, the maximum acceleration may be based on conditions, user preferences, regulations, or other factors. In this case, the maximum acceleration may be set at or below the vehicle's 110 maximum acceleration.

Regardless, the vehicles 110 can then form a platoon 250 based on this information. If all vehicles 110 are empty and have the same physical and mechanical capabilities, for example, then the order of the vehicles 110 may be somewhat irrelevant. If one vehicle 110a is carrying a passenger, on the other hand, and thus, has the lowest maximum acceleration in the platoon 250, the vehicle 110a can be placed in the front of the platoon 250. Of course, in some examples, particularly when the communication latency between the vehicles 110 is sufficiently low, all vehicles 110 in the platoon 250 can simply assume the maximum acceleration of the "lowest" vehicle 110 (i.e., the vehicle 110 with the lowest maximum acceleration) in the platoon 250. In this case, all of the vehicles 110 can essentially act as a single vehicle 110 with a single maximum acceleration. In this configuration, the order of the vehicles 110 may be somewhat irrelevant. In some examples, to minimize discrepancies, each platoon 250 can simply include only vehicles 110 with the same, or similar (e.g., within 10%), maximum acceleration.

In some examples, when platooning, each vehicle 110 can rely on its own sensor array 134 to maintain an acceptable distance to the next vehicle 110, detect obstacles, maneuver, etc. In other examples, the vehicles 110 can be in communication, or networked, with one another to enable data from the sensor array 134 from each vehicle 110 to be used by some, or all, of the vehicles 110 in the platoon 250. In this manner, a vehicle 110d at the rear of the platoon 250 may be able to begin braking sooner than normal (i.e., when not platooning), for example, based on data from the sensor array 134 from one or more of the vehicles 110a, 110b, 110c in front of it.

In some examples, as discussed below with reference to FIG. 3B, this connectivity can be provided with one or more transceivers 396 and other components. In some examples, the vehicles 110 in the platoon 250 can be connected directly to one another. In other examples, the vehicles 110 can be connected via a central control (e.g., a platooning server in a remote location).

Figure 3A:
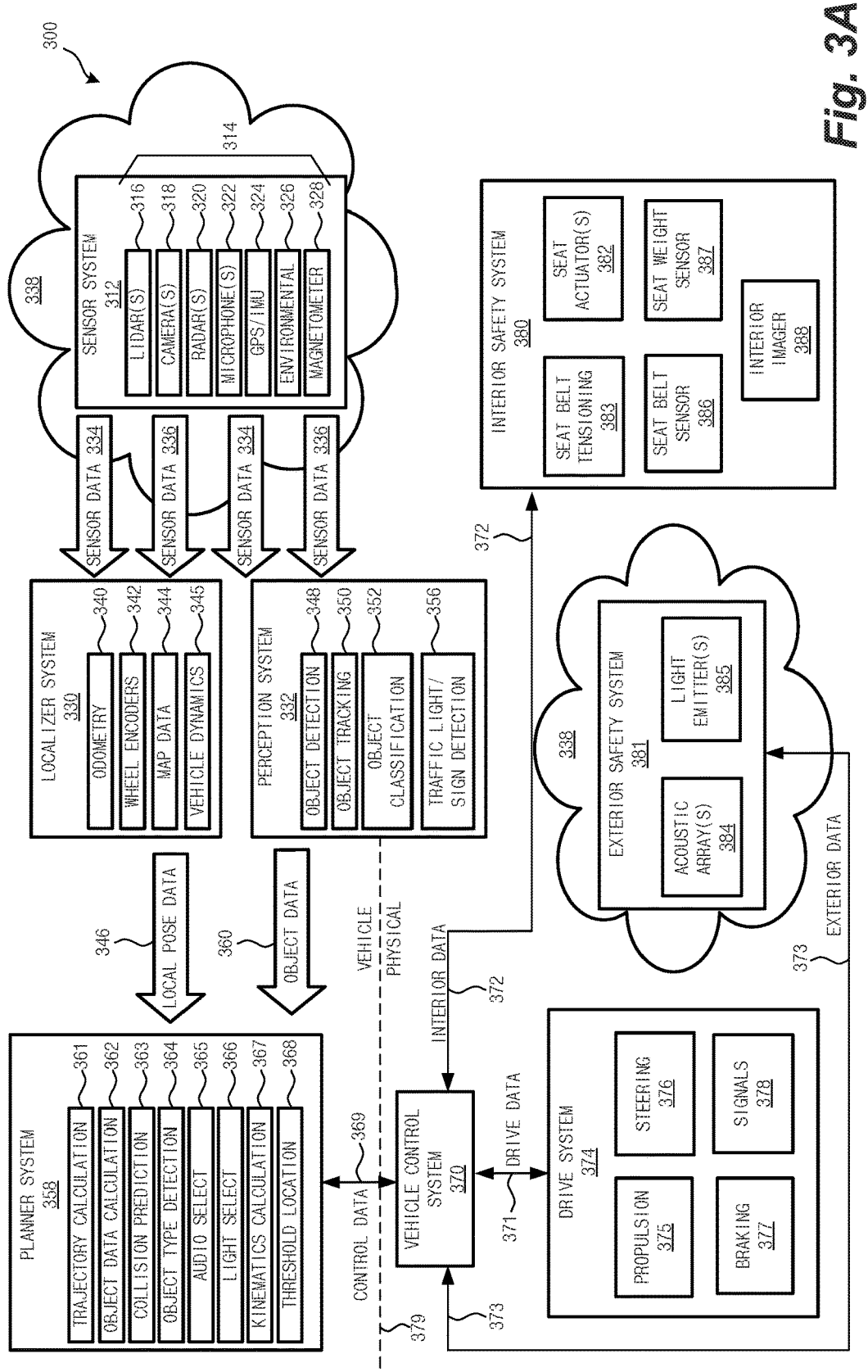
FIG. 3A is a block diagram of an example of an operational control system for controlling a vehicle, in accordance with some examples of the present disclosure.

FIG. 3A is a block diagram of an illustrative operation control system 300 configured to control operations of the vehicle 110. In various implementations, the operation control system 300 may be implemented using a uniprocessor system including one processor, or a multiprocessor system including several processors (e.g., two, four, eight, or another suitable number). In some implementations, the processor(s) can comprise a central processing unit (CPU), a graphics processing unit (GPU), or both a CPU and a GPU, or any other sort of processing unit. The processor(s) may be any suitable processor capable of executing instructions. For example, in various implementations, the processor(s) may be general-purpose or embedded processors implementing any of a variety of instruction set architectures (ISAs), such as the x86, Performance Optimization with Enhanced RISC—Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 300 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic random access memory (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 300 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 3A, the operation control system 300 includes a sensor system 312 including a plurality of sensors 314. The sensors 314 may include, for example, LIDAR 316, image capture sensors 318 (e.g., cameras or other imagers), RADAR 320, sound capture sensors 322 (e.g., microphones), global positioning system (GPS) sensors and/or inertial measurement unit sensors (IMU) 324. The IMU 324 can include, for example, one or more gyroscopes and/or accelerometers to measure the orientation and/or acceleration of the vehicle 110. The sensor system 312 may also include one or more environmental sensors 326, such as, for example, one or more sensors for detecting ambient temperature, temperature of the road surface, humidity, and barometric pressure. The sensor system 312 can also include one or more magnetometers (e.g., electronic compasses) 328 to measure the heading of the vehicle 110 (i.e., the vehicle's orientation with respect to magnetic north). As discussed below, this can be used to maneuver the vehicle 110 at, or below, the maximum acceleration for the cargo.

The operation control system 300 may also include a localizer system 330 and a perception system 332, each of which may receive location and environment sensor data 334 and/or object sensor data 336 from one or more of the sensors 314 of the sensor system 312. For example, the localizer system 330 may receive location and environment sensor data 334 associated with the location of the vehicle 110 in the environment 338, such as from GPS/IMU 324. The perception system 332 may receive object sensor data 336 relevant to determine information associated with objects in the environment 338 surrounding the vehicle 110, such as sensor data from LIDAR 316, image capture sensors 318, RADAR 320, environmental sensors 326, and/or sound capture sensors 322. In some examples, the localizer system 330 may receive data from sources other than the sensor system 312, such as, for example, map data, map tile data, route data, route network definition file (RNDF) data, a data store, and/or a data repository. In some examples, the location and environment sensor data 334 received by the localizer system 330 may be identical (or at least similar to) to the object sensor data 336 received by the perception system 332. In some examples, the sensor data 334, 336 received by the localizer system 330 may not be identical to the sensor data 334, 336 received by the perception system 332. The sensor data 334, 336 may each include data from any combination of one or more sensors or sensor types in the sensor system 312. The amounts and types of sensor data 334, 336 may be independent from one another and/or may be similar or equivalent.

The localizer system 330 may receive and/or access data from sources other than sensor data 334, 336, such as, for example, odometer data 340 from motion sensors configured to estimate a change in position of the vehicle 110 over time, wheel encoders 342 configured to calculate motion, distance, and other metrics associated with the vehicle 110 based on the rotations of one or more of the wheels 114, map data 344 from data representing map tiles, route data, RNDF data, and/or other data, and data representing the model and/or type of vehicle corresponding to the vehicle 110, which may be used to calculate vehicle location data based on vehicle dynamics modeling 345 (e.g., from simulations, captured data, etc.) of the vehicle 110. The localizer system 330 may use one or more of the data resources indicated herein to generate data representing local position and orientation data (e.g., local pose data 346).

In some examples, the perception system 332 may analyze, process, and/or manipulate sensor data 334, 336 to implement object detection 348 and/or an object tracking 350. This can include differentiating between objects that are static and objects that are in motion. The object tracking 350 can also track one or more moving objects based on the movement of the object in the environment 338. This can also include an object classification 352 to identify the object type—e.g., car, motorcycle, cyclist, pedestrian, empty box, trash, etc. The perception system 332 can also include a traffic light/sign detection 356 strategy (e.g., identifying traffic lights, stop signs, railroad crossings, lane markers, and pedestrian crosswalks).

In the example shown, the operation control system 300 also includes a planner system 358 configured to receive the local pose data 346 and object data 360, and analyze the local pose data 346 and the object data 360 to implement functions including, for example, a trajectory calculation 361, an object data calculation 362, a collision prediction 363, an object type detection 364, an audio signal selection 365, a light pattern selection 366, a kinematics calculation 367, and a threshold location estimation 368. The example planner system 358 may communicate trajectory and control data 369 to a vehicle control system 370. The vehicle control system 370 may be configured to process the control data 369 to generate drive system data 371, interior safety system data 372, and exterior safety system data 373. The drive system data 371 may be communicated to a drive system 374, and the drive system 374 may be configured to communicate the drive system data 371 to a propulsion system 375, a steering system 376, a braking system 377, and a signal system 378 (e.g., turn signals, brake signals, headlights, and/or running lights). For example, the drive system data 371 may include propulsion data (e.g., a voltage, current, or power signal for electric motors, and/or a throttle signal for internal combustion engines) for the propulsion system 375, steering angle data for the steering system 376 (e.g., a steering angle setting), and braking data for the braking system 377 (e.g., a deceleration rate to be achieved).

In the example shown in FIG. 3A, a dashed line 379 may represent a demarcation between a vehicle trajectory processing layer and a vehicle physical execution layer, where data processed in the vehicle trajectory processing layer is implemented by one or more of the drive system 374, an interior safety system 380, and/or an exterior safety system 381. For example, one or more portions of the interior safety system 380 may be configured to enhance the safety of occupants of the vehicle 110 in the event of a collision and/or other event, such as an abrupt collision avoidance maneuver by the vehicle 110. In some examples, one or more portions of the exterior safety system 381 may be configured to reduce impact force or other adverse effects of a collision.

The interior safety system 380 may include systems, such as, for example, a seat actuator system 382 and a seat belt tensioning system 383. For example, the seat actuator system 382 and the seat belt tensioning system 383 may be mounted at one or more locations associated with the interior space 130 (see FIG. 1) of the vehicle 110, and may be coupled to, for example, a seat, the floor, a support rail, a support bracket, a support pillar, or other structures. In some examples, the seat actuator system 382 may be configured to move a seat from a first position to a second position using energy from, for example, the impact force of a collision, and may apply a counteracting force to the seat in order to control the acceleration of the seat. In some examples, the counteracting force may be provided by a spring and/or damper of the seat actuator system 382. In some examples, the seat belt tensioning system 383 may be configured to retract a seat belt deployed about an occupant in order to pre-tension or tighten it about the occupant prior to a collision predicted by the planner system 358. The seat actuator system 382 and the seat belt tensioning system 383 may be coupled with one or more structures configured to support mechanical loads occurring due to a collision, abrupt vehicle acceleration or deceleration, evasive maneuvers, sharp turns, and/or hard braking.

The interior safety system 380 can also include a seat belt sensor 386, a seat weight sensor 387, and one or more interior imagers 388. These components, 386, 387, 388 can be used to detect and/or classify cargo in the vehicle 110. The seat belt sensor 386 can be a simple switch or sensor to detect when the seat belt has been fastened around passengers and/or cargo. As the name implies, the seat weight sensor 387 can detect the weight of an object in the seat. In some examples, the seat weight sensor 387 can be a simple weight sensitive switch with a threshold weight. In this configuration, the seat weight sensor 387 may simply be closed when a weight above a threshold weight (e.g., 70 lbs.) is in the seat and open when the weight in the seat is below this threshold (or vice-versa). In other examples, the seat weight sensor 387 can comprise a strain gauge, or other weight sensor, capable of determining the actual weight of the object or passenger in the seat. These inputs 386, 387 can aid the cargo classification system 400 (discussed below) to classify the cargo.

The interior safety system 380 can also include one or more interior imagers 388. The interior imagers 388 may be any known types of digital image sensors, digital or analog cameras, and/or digital or analog video cameras. The interior imagers 388 may be high dynamic range (HDR) cameras, for example, to provide improved accuracy of the images. In some examples, the interior imagers 388 may include one or more of light-sensitive cameras, range sensors, tomography devices, RADAR, and/or ultra-sonic cameras. Other suitable types of imagers are contemplated. The interior imagers 388 may be selected to provide two-dimensional image data, three-dimensional image data, image sequences, gray image data, and/or color image data. In some examples, the interior imagers 388 may be selected to provide depth data, absorption data, and/or reflectance data.

The interior imagers 388 can be aimed at the interior space 130 of the vehicle 110, for example, to provide the cargo classification system 400 with image data. So, for example, if the seat belt sensor 386 indicates the seat belt is buckled, the seat weight sensor 387 indicates 135 lbs., it is likely that a passenger is in the vehicle 110. This can be further confirmed using image data from the interior imagers 388 and image recognition software capable of identifying a human being. These inputs 386, 387, 388 can enable the cargo classification system 400 and other vehicle systems 300, 370 to distinguish between a 130-lb. box, for example, and a 130-lb. passenger and adjust maneuvering limits as necessary.

The exterior safety system 381 may include systems, such as, for example, an acoustic array system 384 and a light emitter system 385. In some examples of the systems of the exterior safety system 381, the systems may be configured to interact with the environment 338 surrounding the vehicle 110, for example, by emitting a steered beam of acoustic energy into the environment 338 using one or more acoustic arrays, and/or by emitting light into the environment 338 using one or more light emitters of the light emitter system 385. The sound and/or light emitted may provide audible and/or visual warnings to objects in the environment 338, such as other vehicles, pedestrians, and cyclists. In some examples, the acoustic arrays may emit acoustic energy into the environment 338 using, for example, transducers, air horns, or resonators. The acoustic energy may be omnidirectional, or may constitute a steered beam or focused sound (e.g., a sound emitted from a directional acoustic source, a phased array, a parametric array, a large radiator, and/or an ultrasonic source). Systems of the exterior safety system 381 may be positioned at one or more portions of the vehicle 110 configured to allow the systems to interact with the environment 338, such as a location associated with an external surface of the vehicle 110.

Figure 3B:
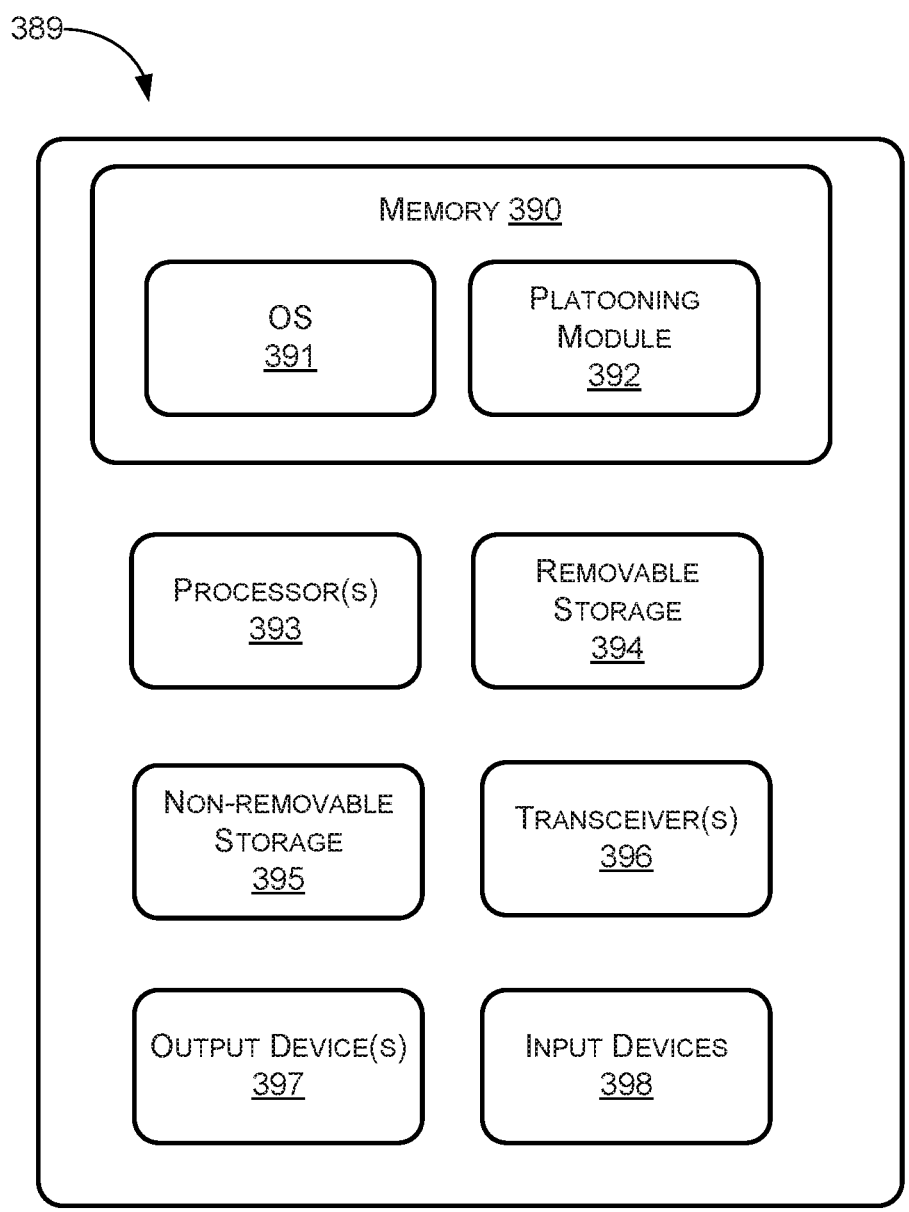
FIG. 3B is a block diagram of an electronic device, in accordance with some examples of the present disclosure.

FIG. 3B is a component level schematic view of an electronic device 389 for use with the system 100. The electronic device 389 can comprise a component of the operation control system 300, the vehicle control system 370, or other electronic components for use with the system 100, 300 and methods 500 described herein. The electronic device 389 can comprise a dedicated electronic device, such as a dedicated microcontroller, or can be a cell phone, smart phone, laptop, tablet, or other electronic devices that comprise a number of components to gather data, communicate, and maneuver, among other things, based on the data.

The electronic device 389 can comprise memory 390 configured to include computer-executable instructions including at least an operating system (OS) 391 for receiving data and controlling the vehicle 110 and a platooning module 392, among other things. The electronic device 389 can also include one or more processors 393, removable storage 394, non-removable storage 395, transceiver(s) 396, and output device(s) 397. Of course, in some examples, rather than being located in the electronic device 389, the OS 391 and/or platooning module 392, or portions thereof, can be located on a remote server, on a passenger's electronic device (e.g., their cell phone), or in another component of the system 100, 300.

In various implementations, the memory 390 can be volatile (such as random access memory, or RAM), non-volatile (such as read only memory, or ROM, flash memory, etc.), or some combination of the two. The memory 390 can also comprise the OS 391. As discussed below, the OS 391 can receive sensor data, provide passenger interfaces, and communicate with other vehicles or a central control, and perform other functions related to the various vehicle 110 systems 100, 300.

The memory 390 can also store incoming vehicle data from the vehicle's sensor array 134 and, in some cases, from other vehicles 110 (e.g., when platooning). As discussed above, the incoming vehicle data can also include video and still images, GPS coordinates, accelerometer readings, etc., from the various sensors (e.g., from the sensor system 312) on the vehicles 110. The incoming vehicle data can enable the electronic device 389 to maneuver, brake, and platoon, among other things.

In some examples, the memory 390 can also include the platooning module 392. As mentioned above, in some examples, a plurality of vehicles 110 can form a platoon 250 to improve efficiency and reduce traffic. In this mode, multiple vehicles 110 can travel close together and, in some examples, can share sensor data to enable the vehicles 110 to react as a single entity and/or to enable vehicles 110 to react more quickly to obstacles and other navigational challenges.

To this end, the platooning module 392 can include algorithms related to arranging the various vehicles 110 in the platoon 250. This can be based at least in part on the maximum acceleration for each vehicle 110, the vehicle's dynamics, and any onboard cargo. In some examples, the platooning module 392 can enable each vehicle 110 to operate separately. In other words, each vehicle 110 can rely on its own sensor array 134 to maintain a predetermined distance (e.g., 10 feet, 20 feet, 30 feet, etc.) from the vehicle 110 in front and maneuver as necessary. In other examples, each vehicle 110 in the platoon 250 can be networked to enable the vehicles 110 to act as a single entity. In the configuration, the front vehicle 110*a*, for example, may have control over all of the vehicles 110 in the platoon 250. In still other examples, each vehicle 110 in the platoon 250 can operate separately, but the vehicles 110 can be networked to share sensor data, maximum acceleration, cargo classification, and other information relevant to platooning.

In some implementations, the processor(s) 393 can comprise a central processing unit (CPU), a graphics processing unit (GPU), or both a CPU and a GPU, or any other sort of processing unit. The processor(s) 393 can be responsible for running software on the electronic device 389, including the OS 391 and platooning module 392, and to interpret and send messages to the central server, if applicable. In some examples, the processor(s) 393 can also perform calculations and provide instructions based on data from the sensor system 312, for example, and various input device(s) 398.

The electronic device 389 can also include additional data storage devices (removable and/or non-removable) such as, for example, magnetic disks, optical disks, or tape. Such additional storage is illustrated in FIG. 3B by removable storage 394 and non-removable storage 395. The removable storage 394 and non-removable storage 395 can store the various modules, programs, passenger interfaces, and algorithms for the OS 391 and platooning module 392, among other things.

Non-transitory computer-readable media may include volatile and nonvolatile, removable and non-removable tangible, physical media implemented in technology for storage of information, such as computer readable instructions, data structures, program modules, or other data. The memory 390, removable storage 394, and non-removable storage 395 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the electronic device 389. Any such non-transitory computer-readable media may be part of the electronic device 389 or may be a separate device (e.g., a jump drive) or a separate database or databank (e.g. at a central server).

In some implementations, the transceiver(s) 396 can include any sort of transceivers known in the art. The transceiver(s) 396 can include, for example, wireless modem(s) to facilitate wireless connectivity with the other vehicles 110, a remote server (if applicable), the Internet, and/or an intranet. Further, the transceiver(s) 396 may include a radio transceiver that performs the function of transmitting and receiving radio frequency communications via an antenna (e.g., cellular, Wi-Fi, or Bluetooth®).

In some implementations, the output device(s) 397 can include any sort of output devices known in the art, such as the displays (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to the passenger. In some examples, the output device(s) 397 can play various sounds related to whether the vehicle 110 is in platooning mode, for example, or sounds intended to alert a passenger to an impending maneuver or collision. Output device(s) 397 can also include ports for one or more peripheral devices, such as headphones, peripheral speakers, or a peripheral display to provide feedback to passengers, for example.

In various implementations, input device(s) 398 can include any sort of input devices known in the art. For example, input device(s) 398 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input device(s) 398 can also include communication ports to receive data from external sensors or cameras, among other things.

As discussed above, in some examples, the system 100 can utilize data from passengers, for example, related to a preferred maximum acceleration. Some passengers may prefer a more spirited ride, for example, while other passengers may prefer the ride to be as smooth as possible. In other examples, the system 100 can comprise one or more input device(s) 398 mounted in the electronic device 389 or connected to the electronic device 389 during installation. In some examples, some of the input device(s) 398 can be housed in the electronic device 389 and the rest of the input device(s) 398 can be installed on the vehicle 110 and connected to the electronic device 389 (e.g., using a wired or wireless connection). This can enable some or all of the system 100 to be installed on vehicles 110 as an aftermarket installation.

Figure 4:
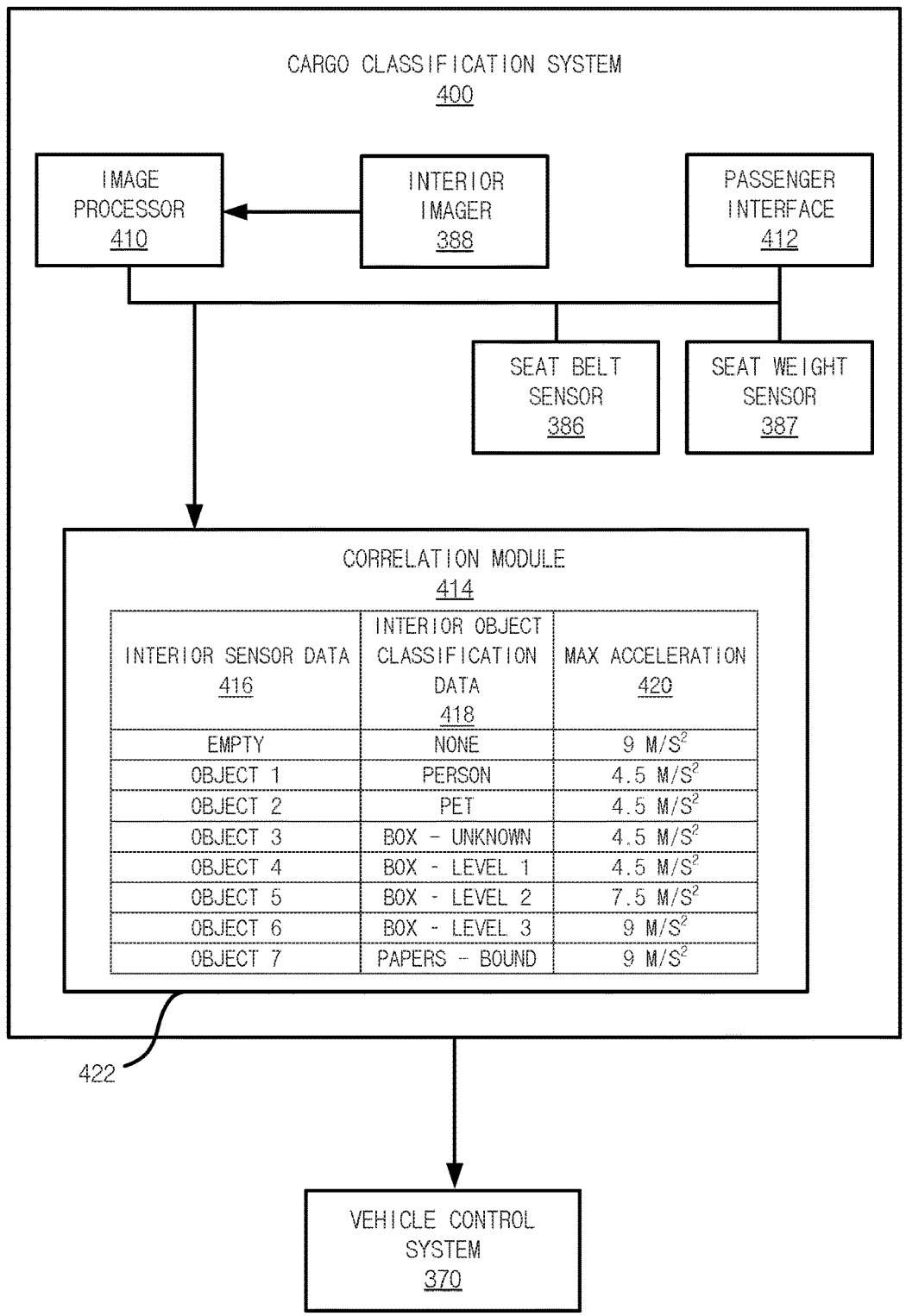
FIG. 4 is a block diagram of an illustrative cargo classification system, in accordance with some examples of the present disclosure.

FIG. 4 is a block diagram of an example showing additional details of a cargo classification system 400 that may be used in connection with a vehicle such as vehicle 110. In some examples, the cargo classification system 400 may be communicatively coupled with the vehicle control system 370. As shown, the cargo classification system 400 can include one or more of the inputs 386, 387, 388 of the interior safety system 380, an image processor 410, and, in some cases, a passenger interface 412 to receive passenger input to classify cargo in the vehicle 110. As shown, the cargo classification system 400 can also comprise a correlation module 414, which can include interior sensor data 416 correlated to a plurality of interior object classification data 418 and an associated maximum acceleration 420 for the vehicle 110. As mentioned above, the maximum acceleration 420 can be adjusted based in part on whether the vehicle 110 is empty or has cargo and, if it has cargo, the classification thereof (e.g., person, pet, box, papers, etc.).

In some examples, the cargo classification system 400 can include the interior imager 388 configured to capture image data associated with the interior space 130 of the vehicle 110. The example cargo classification system 400 may also include an image processor 410 in communication with the interior imagers 388. The image processor 410 may be configured to receive the image data from the interior imagers 388 and determine interior object classification data 418 associated with the interior space 130 of the vehicle 110, at least in part, on the image data. In some examples, the image processor 410 can include image recognition software, for example, to enable the cargo classification system 400 to distinguish between cargo and passengers, among other things.

In some examples, image data can be processed by the image processor 410 based on an image shape profile obtained from the image data from the interior imagers 388. This image data can be analyzed according to one or more machine learning procedures, such as, for example, a convolutional neural network (CNN), a support vector machine (SVM), a random decision forest regression analysis, and/or any other suitable regression analysis. The interior imagers 388 may be, for example, a plenoptic single or multi-camera system focused on a relatively small portion of the interior space 130 of the vehicle 110 and configured to obtain an image shape or depth profile by defocusing the one or more of the interior imagers 388. In some examples, the image depth profile may be enhanced using multi-views from the interior imagers 388, which may provide overlapping image data.

Regarding analysis of the image data, in some examples, the one or more machine learning procedures may be configured to be trained by inputting known image data, and in some examples, other known parameters, along with known interior object classification data 418 corresponding to the known image data and parameters. Based on this training, the machine learning procedures may receive image data (e.g., the image shape profiles) and other known parameters, and the image processor 410 may correlate or determine the interior object classification data 418 corresponding to the image data and other sensor data. For example, to the extent the image data and/or parameters is/are different than those input for training, the machine learning procedures may determine the interior object classification data 418 by taking one or more of those differences into account when analyzing the current image data. Examples of other parameters include, but are not limited to, any data associated with the vehicle 110, such as, for example, data from the seat belt sensor 386 indicating that the seat belt is buckled or data from the seat weight sensor 387 indicating the weight of the object in the seat. If the seat belt sensor 386 indicates that the seat belt is unbuckled, the seat weight sensor 387 indicates that cargo weighs 12 lbs., and the image processor 410 identifies the object as rectangular, for example, it is unlikely to be a passenger.

In some examples, the image processor 410 may use the above-noted image depth profile and machine learning procedures to analyze the image data and determine characteristics related to the cargo. These characteristics may be used to identify one or more material characteristics of the cargo, such as, for example, the type of material, the surface characteristics of the material (e.g., characteristics such as smooth or abrasive), and/or whether the shape of the cargo is geometric or organic, among other things. The image processor 410 in some examples may use feature extraction techniques to identify lines, edges, ridges, textures, and shapes in the image data to distinguish between a box, for example, and a dog.

In some examples, the image data may be pre-processed to, for example, re-sample it, reduce noise in the data, and/or enhance the contrast in the image data. In some examples, the image processor 410 may use one or more of the following techniques to analyze the image data: point of interest selection, segmentation, image recognition, and image registration. In some examples, multi-view stereo techniques may be used to acquire and analyze the image data. In some examples, the amount of data associated with the image data may be increased by perturbing the image data.

In some examples, the cargo classification system 400 can also receive passenger input from the passenger interface 412. In some examples, the passenger interface 412 can include a touchscreen, keyboard, or other inputs to receive passenger input as to the nature of the cargo. In other examples, the passenger may provide passenger input when reserving the vehicle 110 (e.g., calling for an automated taxi or delivery truck) via, for example, an internet or cellular application (or, "app"). The passenger input can include the nature of the cargo (e.g., how fragile it is), how it is packaged, weight (though this can be determined with the seat weight sensor 387). In some examples, the passenger input can include a fragility rating. The fragility rating can be a number from one to ten, for example, with one being practically unbreakable (e.g., paper, hammers, golf balls, etc.) and ten being very fragile (e.g., vases, wine glasses, etc.). Thus, the passenger may place a box of papers on the back seat and provide passenger input to the cargo classification system 400 (e.g., contents—paper, container—cardboard box, fragility rating—0).

In other examples, the passenger input can include personal acceleration preferences. In other words, older passengers may find high rates of acceleration uncomfortable, while younger passengers might actually find it fun. Similarly, passengers may be ill, had surgery recently, or be otherwise infirm and desire lower acceleration temporarily (e.g., during recovery) or permanently. To this end, in some examples, the passenger input can also include a desired maximum acceleration for each passenger via the passenger interface 412, or other means. In some examples, the cargo classification system 400 can use the lowest of the passenger settings whenever possible.

In some examples, each passenger's maximum acceleration settings can be part of a passenger profile. In this manner, when a passenger makes a reservation for a taxi, for example, their acceleration settings are automatically provided to the taxi. In some examples, the passenger may be able to provide different acceleration for lateral and longitudinal acceleration. In other words, the passenger may be comfortable with higher longitudinal acceleration (e.g., from braking) because the vehicle's seat belts tend to resist this type of acceleration. A passenger recovering from hernia surgery, on the other hand, might have a substantially reduced tolerance for lateral acceleration, where core muscles are required to resist movement.

As shown in FIG. 4, the illustrated example of the cargo classification system 400 can include a correlation module 414 in communication with the image processor 410, interior imager 388, and other inputs 386, 387, 412. The correlation module 414 is configured to provide a correlation between the interior sensor data 416 (e.g., data from the interior imager 388 and/or image processor 410, passenger interface 412, seat belt sensor 386, and seat weight sensor 387) and the interior object classification data 418.

Interior object classification data 418 can comprise a plurality of datasets related to various objects, people, pets, and other cargo that has been provided to, or learned by, the cargo classification system 400. As shown, the interior object classification data 418 can include datasets for when the vehicle is empty—e.g., nothing other than the vehicle interior in the image data, little or no weight indicated on the seat weight sensor 387, seat belt sensor 386 indicates seat belt is unbuckled, etc.). The interior object classification data 418 can also include datasets for when the vehicle is occupied by a person ("Object 1") or a pet ("Object 2") using, for example, object classification, facial recognition software, detection of a passenger's mobile device, and/or other sensor inputs (e.g., the seat weight sensor 387). The interior object classification data 418 can also include several datasets for when the cargo is a box, for example, of varying construction or contents. In other words, of the cargo is a box that is relatively flimsy (e.g., paperboard) full of doughnuts, for example, the cargo may be classified as "Box—Level 1," indicating a fragile box and/or fragile contents. If the cargo is a sturdy cardboard box full of bolts, on the other hand, the cargo may be classified as "Box—Level 3," indicating more robust packaging and/or more rugged cargo. It should be noted that, though eight datasets are shown, any number of datasets may be used. For example, additional datasets could be used to improve accuracy and correlation. Indeed, the number of datasets may be ever increasing as the cargo classification system 400 is introduced to, and "learns," new interior object classification data 418. Alternatively, decision-making complexity may be reduced by limiting the number of datasets to two (e.g., indicating the presence of a person or not).

In some examples, the image processor 410 is configured to determine the interior object classification data 418 associated with the cargo based, at least in part, on the correlation between the interior sensor data 416 and the known interior object classification data 418. In some examples, the correlation between the interior sensor data 416 and the interior object classification data 418 may include at least one of a correlation table correlating the interior sensor data 416 and interior object classification data 418, or a mathematical relationship between the image data and the interior object classification data 418. In some examples, the correlation between the interior sensor data 416 and the interior object classification data 418 may be determined according to the above-noted image depth profile and machine learning techniques.

In the example shown in FIG. 4, the correlation module 414 includes a correlation table 422. The example correlation table 422 provides a correlation between interior sensor data 416 and interior object classification data 418 related to various types of cargo that may be carried by the vehicle 110. In the example shown, the correlation table 422 also provides a correlation between the interior object classification data 418 and the maximum acceleration 420 for the vehicle 110. For example, the correlation module 414 receives the interior sensor data 416 from the above-mentioned inputs 386, 387, 388, 410, 412 and uses the correlation table 422 to identify the cargo that most closely matches known parameters for various types of cargo. As noted above, this correlation may be based solely on and image depth profile or shaped profile and machine learning techniques, among other things. Based on the cargo identified, the correlation module 414 uses the correlation table 422 to identify the estimated interior object classification data 418, for example, and provide a maximum acceleration 420 to the as shown in FIG. 4. In other examples, the cargo classification system 400 may provide a cargo classification to the vehicle control system 370 and the vehicle control system 370 may determine the maximum acceleration 420.

In some examples, the cargo may not have a strong correlation with any entry in the interior object classification data 418. In other words, the cargo classification system 400 may determine that the cargo has a similar probability of being any classification (i.e. the difference in probability that the cargo is in one class as opposed to any other is low, e.g., less than 5-10%) or the probability that the cargo is any classification is less than some threshold (e.g., less than 5% probability). In either case, in some examples, the cargo classification system 400 can simply set the maximum acceleration 420 to the lowest setting (e.g., for the setting for an infant). In other cases, the cargo classification system 400 can perform a weighted average of probability and the risk, which can be a general weighted average or based in part on the correlation. In still other embodiments, the cargo classification system 400 can contact a central control and provide data associated with the cargo for additional processing. In this case, the cargo classification system 400 can receive a classification based on the response from the central control. In yet other embodiments, the cargo classification system 400 can contact a teleoperator (e.g., a worker in a remote location or at the central control) and make a classification of the cargo based at least in part on the response from the teleoperator.

As shown in FIG. 4, the example correlation table 422 shows interior sensor data 416 relates to Object 1 (empty) through Object 7 (papers—bound). The example correlation table 422 also includes example interior object classification data 418 associated with the examples of the interior sensor data 416 and the example maximum acceleration 420 corresponding to the example interior sensor data 416. In this example, the correlation table 422 receives the interior sensor data 416 from one or more sources (e.g., the image processor 410, the seat weight sensor 387, etc.). The example correlation table 422 represents discrete interior sensor data 416 sets received from the interior sensors and inputs 386, 387, 388, 410, 412 as "Empty" information, Object 1 information, Object 2 information, through Object 7 information. In some examples, the interior sensors and inputs 386, 387, 388, 410, 412 may be configured to capture the discrete image data at, for example, predetermined time intervals, or some other triggering events.

Based on the content of the interior sensor data 416, the correlation module 414 determines the interior object classification data 418 that most closely matches the interior sensor data 416 from a discrete data set. The correlation module 414 receives, for example, data from the image processor 410 and the seat weight sensor 387, for example, analyzes it, and determines that the interior sensor data 416 for Object 3 most closely correlates to a cardboard box, but of unknown construction and contents. As a result, the correlation module 414 provides a lower maximum acceleration 420 (e.g., 4.5 m/s$^2$). In other examples, the correlation module 414 receives, for example, data from the image processor 410, the seat belt sensor 386, and the seat weight sensor 387, for example, analyzes it, and determines that the interior sensor data 416 for Object 3 is almost certainly a person. As a result, the correlation module 414 provides a maximum acceleration 420 (e.g., 4.5 m/s$^2$) associated with established standards for passenger comfort and safety.

In some examples, the interior sensor data 416 may relate to more than one object in the interior of the vehicle 110. Thus, the cargo classification system 400 may detect both a passenger (Object 1) and a box—level 3 (Object 6). In this case, in some examples, the cargo classification system 400 can set the maximum acceleration 420 based on the lowest acceleration between the two objects (e.g., 4.5 m/s$^2$). In other examples, the cargo classification system 400 can set the maximum acceleration 420 based on a weighted average, or some other average, between the two accelerations 420. Of course, in some examples, the two objects may have the same maximum acceleration (e.g., a person—object 1 and an unknown box—object 3), resulting in the same acceleration 420 (e.g., 4.5 m/s$^2$) either way.

The example list of interior object classification data 418 is not exhaustive, and merely provides several examples for the purpose of demonstration. Other cargo and the corresponding data may also be included, such as, for example, children, electronics, and groceries. In addition, within each of the interior object classification data 418 examples shown in FIG. 4, there may be further sub-categories. For example, within "Person," there may be many different sub-categories, such as, for example, "heavy adult," "adult," "teen," "pre-teen," "child," "toddler," and "baby," which may each correlate to unique interior object classification data 418 and/or maximum acceleration 420. In addition, the example maximum acceleration 420 are for discussion purposes only and should not be viewed as limiting.

Figure 5A:
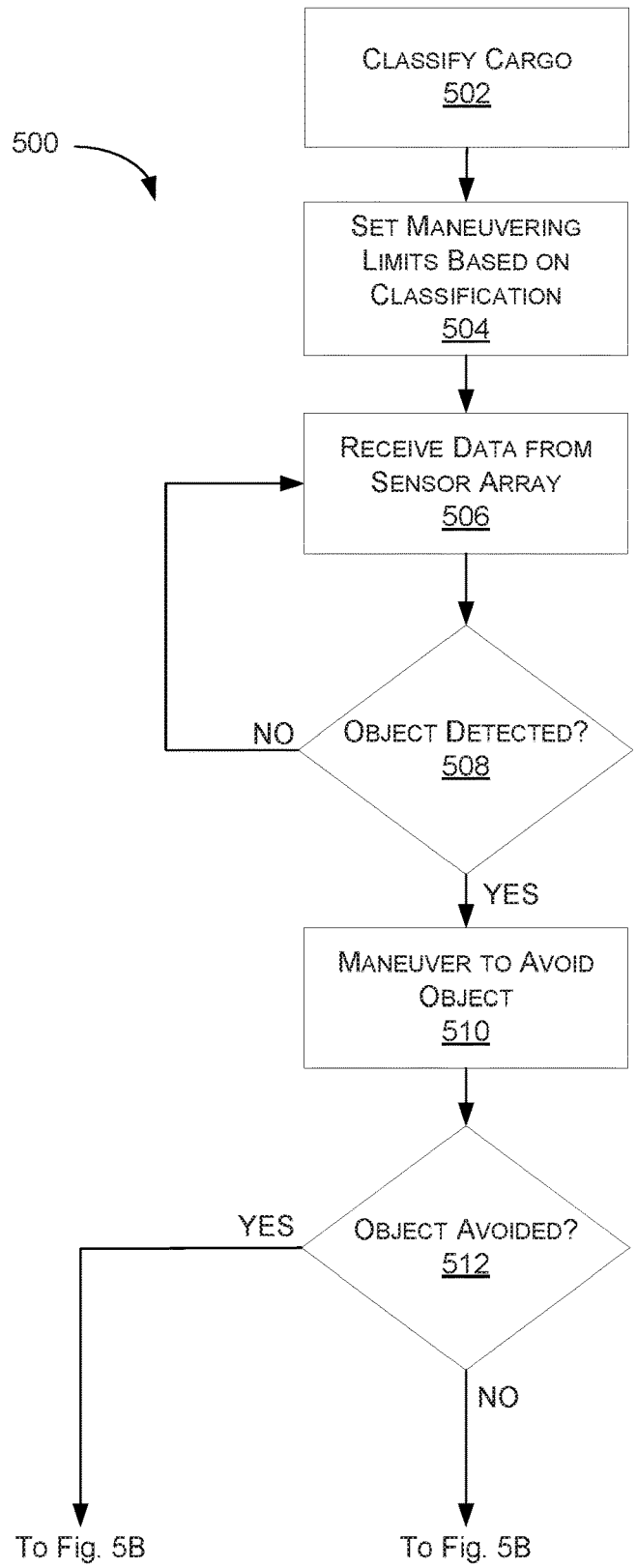
FIGS. 5A-5C are flow diagrams of an example of a method for maneuvering a vehicle in response to an object in the path of the vehicle, in accordance with some examples of the present disclosure.
Figure 5B:
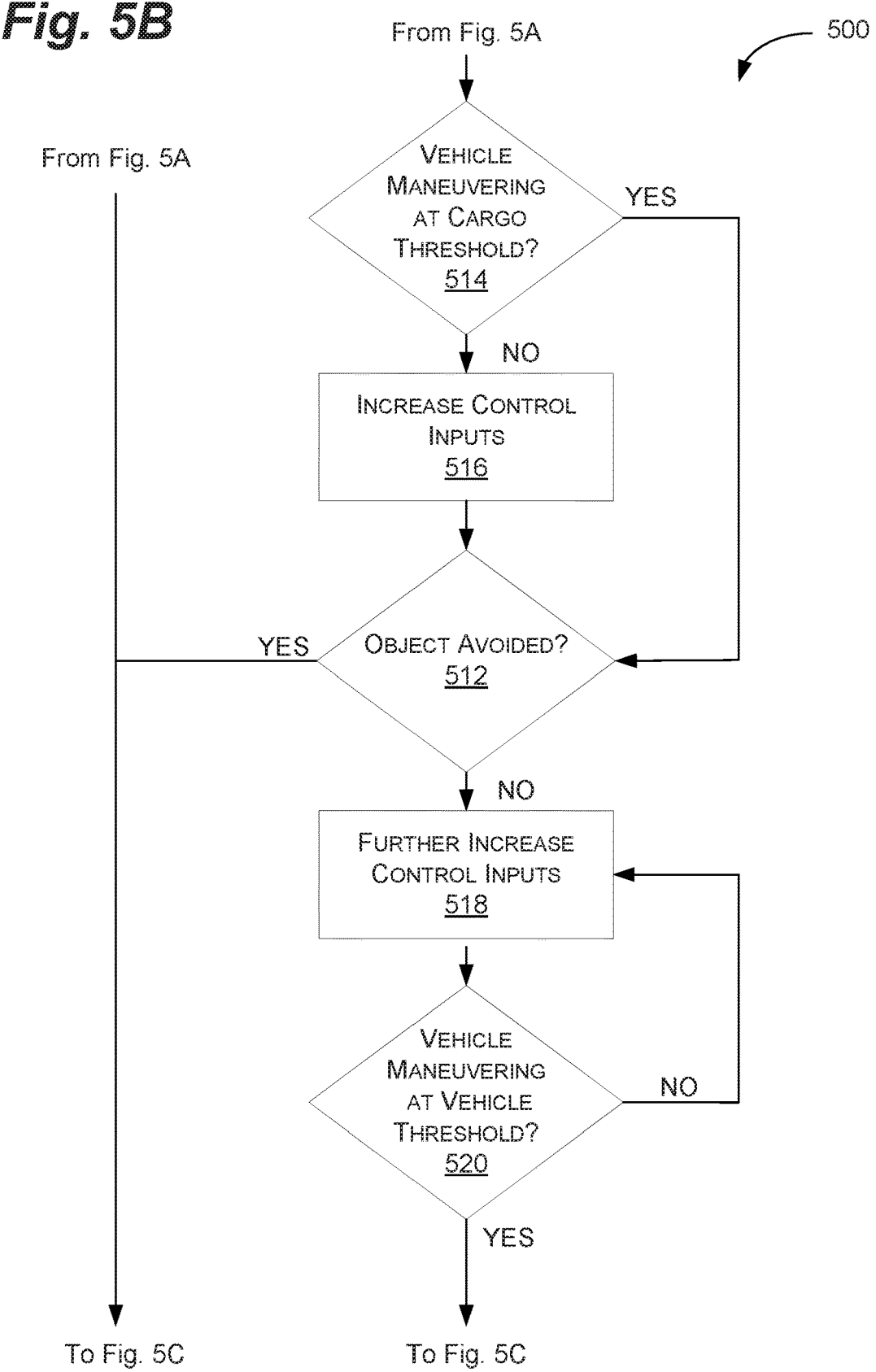
Figure 5C:
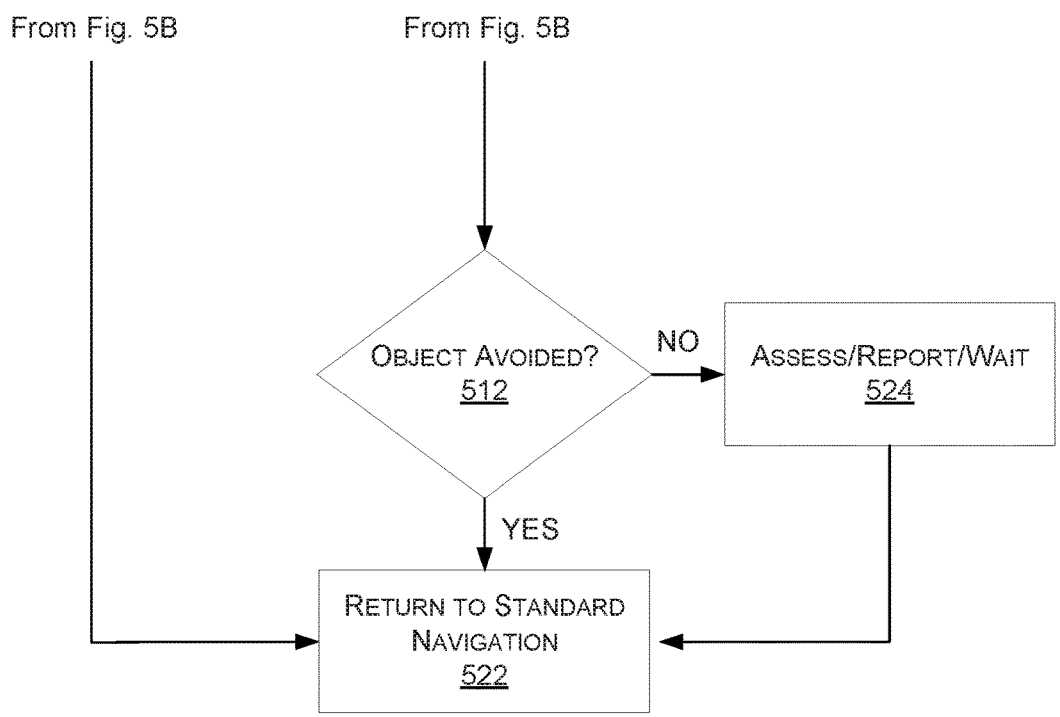

As shown in FIGS. 5A-5C, examples of the present disclosure can also comprise a method 500 for the detection and avoidance of obstacles by automated vehicles. As used herein, obstacles can include many objects that may cause damage or injury to the vehicle 110 or its occupants or that the vehicle 110 may damage or injure. Thus, an obstacle can include a ladder in the road, a person, a wall, or a guardrail, among other things. As shown, the method 500 can determine whether or not the vehicle 110 has cargo, classify the cargo (if applicable), and then maneuver within varying maneuvering limits based at least in part on whether the vehicle 110 is carrying cargo and, if so, the classification of the cargo.

As mentioned above, the detection and classification of cargo within the vehicle 110 can be carried out using seat weight sensors 387, seat belt sensors 386, image processors 410, and other devices. Based at least in part on whether the vehicle 110 contains cargo, and, if so, the classification of the cargo, the vehicle control system 370 can make appropriate adjustments to control inputs (e.g., steering, braking, acceleration, etc.) to ensure the desired maximum acceleration are not exceeded unless necessary to avoid an accident.

As shown in FIG. 5A, at 502, the method 500 can classify the cargo in the vehicle 110 using, for example, the cargo classification system 400. As discussed above, classifying the cargo can comprise receiving various interior sensor data 416 at a correlation module 414 for comparison to interior object classification data 418 in an attempt to identify the cargo in the vehicle 110. The interior object classification data 418 can then be used to set an appropriate maximum acceleration 420. Obviously, a piece of billet aluminum, for example, can withstand higher acceleration than a puppy. As discussed above with reference to FIG. 4, in some examples, the vehicle 110 may be empty and have no cargo (e.g., passengers or other cargo). In this configuration, the cargo classification system 400 can simply classify the cargo as "Empty."

At 504, the method can set the appropriate maneuvering limits based on the classification of the cargo and/or the confidence of the classification. In some examples, the maneuvering limits can be set, for example, based on a maximum acceleration. This can include lateral acceleration, longitudinal acceleration, or a combination thereof, caused by acceleration, turning, and braking of the vehicle. Thus, the maximum acceleration 420 associated with the various interior object classification data 418 can be used to ensure that cargo is not damaged or injured by excessive acceleration. The maximum acceleration 420 can be provided to the vehicle control system 370, for example, to inform how the vehicle control system 370 maneuvers the vehicle 110.

In some examples, the level of correlation between the interior sensor data 416 and the interior object classification data 418, for example, can be a factor in setting the maneuvering limits. In other words, if there is a high level of correlation, the appropriate maximum acceleration 420 can be used without modification. If the correlation is low between the interior sensor data 416 and the interior object classification data 418, on the other hand, then the maximum acceleration 420 associated with that interior object classification data 418 may be reduced somewhat as a safety margin. If, for example, the cargo classification system 400 classifies an object as a "Box—Level 2," for example, but with a low correlation, the maximum acceleration 420 may be reduced from 7.5 m/s² to 6 m/s² (or some other reduced rate).

At 506, as the vehicle 110 travels the vehicle control system 370, and other vehicle systems, can receive data from one or more sensor arrays 134. The sensor arrays 134 can scan an area 112 proximate the vehicle 110 for potential obstacles or obstructions with which the vehicle 110 may collide given its current trajectory. The sensor arrays 134 can include forward and rearward looking sensors to identify obstacles in the path of, or behind, the vehicle 110. If another vehicle is approaching quickly from behind, for example, it may be possible for the vehicle 110 to accelerate to avoid a collision. Similarly, if another vehicle pulls in front of the vehicle 110, it may be possible for the vehicle to steer around the other vehicle or stop prior to hitting the other vehicle. Similarly, if a manually operated vehicle is driving behind the vehicle 110, acceleration limits may be calculated based on some typical stopping function (e.g. a function of human response time and braking force) such that braking by the vehicle 110 does not cause an accident.

In some examples, the sensor arrays 134 can also include one or more side-looking sensors to detect obstacles approaching the vehicle 110 from the sides. This can include other vehicles approaching from a side street, for example. This can also include children or pets, for example, running into the street from a sidewalk or yard. As discussed above, in some examples, data from the sensor arrays 134 can be further processed by the perception system 332 to provide obstacle detection 348, obstacle tracking 350, obstacle classification 352, etc.

At 508, the method 500 can determine if an obstacle is detected in the path of the vehicle 110. This can include obstacles that are currently in the path of the vehicle 110 such as a box or tire in the middle of the vehicle's travel lane. This can also include an obstacle on a collision course with the vehicle 110, such as another vehicle approaching from a side road or in an intersection. If no obstacle is detected, the vehicle 110 can continue along its travel path receiving data from the sensor array 134, i.e. returning to 506.

At 510, if an obstacle is detected, on the other hand, the vehicle control system 370 can maneuver the vehicle 110 to avoid the obstacle. This can include accelerating, braking, steering, or a combination thereof in an effort to avoid the obstacle. As discussed above, the vehicle control system 370 can maneuver the vehicle 110 at a rate designed not to exceed the aforementioned maximum acceleration 420 unless absolutely necessary.

Of course, in some examples, a slight course deviation may be sufficient to avoid the obstacle. Thus, the vehicle 110 may be able to avoid a collision by braking slightly until a moving obstacle clears the path of the vehicle 110, for example, or brake slightly to enable another vehicle to accelerate. In other examples, the vehicle 110 may have to maneuver at, or above the maximum acceleration for the cargo (e.g., it may be better to avoid an accident despite some discomfort for passengers).

At 512, the vehicle 110 can determine if the obstacle was avoided. This can be achieved, for example, by tracking the obstacle with the sensor arrays 134 to ensure the obstacle passed alongside the vehicle 110, for example, or is now behind the vehicle 110 (e.g., by switch from the "front" sensor array 134 to the "rear" sensor array, depending on the direction of travel 120, 122). In some examples, this can also be achieved using the aforementioned accelerometer/gyroscope 324. In other words, a collision with another vehicle, for example, will cause a relatively large spike in acceleration that can be detected with the accelerometer/gyroscope 324.

If the obstacle was avoided, at 522, the vehicle 110 can simply return to normal navigation. See, FIG. 5C. If, on the other hand, the obstacle is still on a collision course with the vehicle (or vice-versa), it may be necessary to progressively increase control inputs to avoid a collision. As discussed below, the vehicle 110 can increase the inputs up to, and sometimes beyond, the maximum acceleration for the cargo.

As shown in FIG. 5B, at 514, if the obstacle has not yet been avoided, the vehicle control system 370 can receive data from the sensor system 312 related to the current acceleration for the vehicle 110 to determine if the vehicle 110 is accelerating at the maximum acceleration 420 for the cargo. This can include data related to the braking system 377, steering system 376, and propulsion system 375 from the vehicle's drive system 374. This can also include direct measurement of the vehicle 110 acceleration including, for example, data from the accelerometer/gyroscope 324. This data can be used to determine if the vehicle 110 is maneuvering at the maximum acceleration 420 for the cargo, or the "cargo threshold."

At 516, if (1) the vehicle 110 is not maneuvering at the maximum acceleration 420, and (2) additional input is indicated to avoid the detected obstacle, the vehicle control system 370 can increase one or more inputs to the drive system 374 in an effort to avoid the obstacle, while remaining below the maximum acceleration 420.

At 512, the method 500 can again determine if the obstacle has been avoided. If the obstacle was avoided, at 522, the vehicle 110 can simply return to normal navigation. See, FIG. 5C. If, on the other hand, the obstacle is still on a collision course with the vehicle (or vice-versa), it may be necessary to again increase control inputs to avoid a collision. As discussed below, this can include increasing the vehicle acceleration up to, and including, the vehicle's maximum acceleration (i.e., as limited by the vehicle's braking system 377, steering system 376, available traction, and other factors). In other words, in many cases, it may be desirable to avoid a collision with the obstacle despite exceeding the maximum acceleration 420 for the cargo.

To this end, at 518, if the vehicle 110 is still determined to be on a collision course with the obstacle (or vice-versa), the method 500 can further increase the control inputs to exceed the maximum acceleration 420 for the cargo up to, and including, the maximum acceleration for the vehicle 110. Again, the vehicle control system 370 can receive data from the sensor system 312 related to the current acceleration for the vehicle 110 to determine if the vehicle 110 is accelerating at the maximum acceleration for the vehicle 110 (as opposed to the cargo). Slight damage to the cargo due to the increased acceleration, for example, may be preferable to extensive damage caused to the cargo and/or the vehicle 110 from a collision.

At 520, the vehicle control system 370 can receive data from the sensor system 312 related to the current acceleration for the vehicle 110 to determine if the vehicle 110 is accelerating at the maximum acceleration for the vehicle 110. This can include data related to the braking system 377, steering system 376, and propulsion system 375 from the vehicle's drive system 374. This can also include direct measurement of the vehicle 110 acceleration including, for example, data from the accelerometer/gyroscope 324. This data can be used to determine if the vehicle 110 is maneuvering at the maximum acceleration 420 for the vehicle, or the "vehicle threshold."

As shown in FIG. 5C, at 512, the method 500 can again determine if the obstacle was avoided. At 522, if the obstacle was avoided, the vehicle 110 can return to standard navigation towards its destination. If braking was necessary, for example, the vehicle 110 can accelerate back to a normal velocity. If the vehicle 110 was required to swerve, on the other hand, the vehicle 110 can return to the previous course or trajectory, get back in the proper lane, return to the correct side of the street, etc.

Of course, regardless of reaction times and acceleration, not all accidents can be avoided. At 524, therefore, the vehicle 110 can assess the result of the collision. It may be difficult, for example, for the perception system 332 to determine if a box in the road is empty or full. Thus, the vehicle 110 may attempt, but fail, to avoid a box that turns out to be empty. In this case, the vehicle 110 can determine that a collision has occurred, but that no damage has resulted. As a result, at 522, the vehicle 110 can simply return to standard navigation.

If, on the other hand, an assessment reveals a collision between the vehicle 110 and a more solid obstacle (e.g., a ladder or another vehicle), for example, the vehicle 110 may report the accident to a central control facility. In this case, a remote assistant (e.g., a person at the control center) may review the accident using data from the sensor array 134 (e.g., the imagers 136) to determine the level of damage and possibly fault for the accident.

In some examples, the vehicle 110 may also report the accident to the central control or to local authorities (e.g., police or state patrol) automatically either (1) regardless of severity or (2) when the collision exceeds a certain threshold. If, for example, a collision exceeds 1G of acceleration, then the vehicle 110 may report the incident to the central control and the local authorities. If the collision is below 1G, on the other hand, the vehicle 110 may only report the incident to the central control for further assessment (e.g., the vehicle 110 may have simply hit a tire carcass or ladder in the road).

At 524, in some examples, like many vehicles involved in an accident and depending on the severity of the collision, the vehicle 110 can wait for local authorities and/or support services to arrive. This may be necessary to enable local authorities to conduct an accident investigation, for example, or because the vehicle 110 is damaged and cannot continue. Of course, regardless of the severity of the accident the vehicle 110 (e.g., the operation control system 300) may seek confirmation from any passengers that they are unhurt. If the passenger indicates that are injured, the vehicle 110 and/or central control may also immediately contact emergency medical services (EMS). At 522, when the vehicle 110 is released it can return to normal navigation, if possible. If not, the vehicle 110 can be towed to a service center, for example, for repairs.

Of course, FIGS. 5A-5C relate to a method 500 using acceleration feedback as an input. One of skill in the art will recognize, however, that the method 500 could also be executed in a "feed-forward" manner. In other words, the operation control system 300 can be programmed with various inputs at which the vehicle will be braking or turning at the maximum acceleration for the cargo or vehicle, as applicable. In straight line braking, for example, the operation control system 300 can apply a predetermined hydraulic pressure (e.g., 1800 psi) to the braking system 377 designed to effect braking at the maximum acceleration (or rather, deceleration) rate. Similarly, based on the vehicle's speed and other factors, the operation control system 300 can apply a predetermined steering angle input to cause a turning maneuver at the maximum acceleration.

FIGS. 5A-5C are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for estimating friction-related data and technologies for vehicle control have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method for platooning vehicles comprising:
   determining a first maximum acceleration of a first vehicle;
   receiving, at the first vehicle, data related to a second maximum acceleration for a second vehicle;

determining the first maximum acceleration is greater than the second maximum acceleration; and maneuvering, with an operation control system, the first vehicle into a position behind the second vehicle to form a first platoon.

2. The method of claim 1, wherein the first maximum acceleration or the second maximum acceleration is based at least in part on whether the first vehicle or the second vehicle is carrying cargo.

3. The method of claim 2, wherein the first maximum acceleration or the second maximum acceleration is based at least in part on a classification of the cargo in the first vehicle or the second vehicle.

4. The method of claim 1, further comprising:
receiving, at the first vehicle, data related to a third maximum acceleration for a third vehicle;
determining that the first maximum acceleration is greater than the third maximum acceleration; and
maneuvering, with the operation control system, the first vehicle into a position behind the second vehicle and the third vehicle to form a second platoon.

5. The method of claim 1, further comprising:
receiving, at the first vehicle, sensor data from the second vehicle indicating an object in a path of the first platoon; and
maneuvering the first vehicle at an acceleration greater than or equal to the second maximum acceleration to avoid the object.

6. The method of claim 1, wherein the first vehicle is empty and the second vehicle contains one or more passengers.

7. A first vehicle comprising:
a transceiver to send and receive at least one of wireless communications or wired communications;
a vehicle control system configured to maneuver the first vehicle at, or below, a first maximum acceleration; and
one or more computer-readable media storing instructions executable by one or more processors on the first vehicle, wherein the instructions, when executed, cause the one or more processors to:
receive, at the transceiver, second vehicle data related to a second vehicle, the second vehicle data comprising at least a second maximum acceleration for the second vehicle;
determine a first platooning order for the first vehicle and the second vehicle based at least in part on the first maximum acceleration and the second maximum acceleration; and
send, with the transceiver, a first signal to the second vehicle, the first signal comprising one or more of the first maximum acceleration or the first platooning order and configured to cause the second vehicle to form a first platoon with the first vehicle based at least in part on the first platooning order.

8. The first vehicle of claim 7, wherein the first maximum acceleration is lower than the second maximum acceleration; and
wherein the first platooning order comprises the first vehicle positioned in front of the second vehicle in the first platooning order with respect to a direction of travel.

9. The first vehicle of claim 8, the instructions further causing the one or more processors to:
receive, at the transceiver, third vehicle data related to a third vehicle, the third vehicle data comprising at least a third maximum acceleration for the third vehicle;

determine a difference between the first maximum acceleration and the third maximum acceleration;
determine that the difference meets or exceeds a threshold value; and
determine, based at least in part on the difference meeting or exceeding the threshold value, that the third vehicle cannot be included in the first platoon.

10. The first vehicle of claim 7, the instructions further causing the one or more processors to:
receive, from a sensor on the first vehicle, sensor data associated with an area proximate the first vehicle;
determine, based at least in part on the sensor data, that an object is in a path of the first vehicle;
send a second signal to the vehicle control system to cause the first vehicle to maneuver in response to the object; and
send, with the transceiver, a third signal to the second vehicle configured to cause the second vehicle to maneuver in response to the object.

11. The first vehicle of claim 10, wherein:
the first vehicle maneuvers at, or below, the first maximum acceleration; and
the second vehicle maneuvers at, or below, the second maximum acceleration.

12. The first vehicle of claim 10, wherein:
the first vehicle maneuvers at, or below, the first maximum acceleration; and
the second vehicle maneuvers at, or below, the first maximum acceleration.

13. An electronic device comprising:
one or more processors; and
one or more computer-readable media storing instructions executable by the one or more processors, wherein the instructions, when executed, cause the one or more processors to:
receive first vehicle data related to a first vehicle, the first vehicle data comprising at least a first maximum acceleration for the first vehicle;
receive second vehicle data related to a second vehicle, the second vehicle data comprising at least a second maximum acceleration for the second vehicle;
determine a first platooning order for the first vehicle and the second vehicle based at least in part on the first maximum acceleration and the second maximum acceleration; and
send a first signal to the second vehicle, the first signal comprising one or more of the first platooning order or the first maximum acceleration and configured to cause the first vehicle and the second vehicle to form a first platoon based at least in part on the first platooning order.

14. The electronic device of claim 13, the instructions further causing the one or more processors to:
receive a second signal from the first vehicle indicating the first vehicle is braking; and
send a third signal to the second vehicle configured to cause the second vehicle to brake.

15. The electronic device of claim 13, wherein:
the first maximum acceleration is higher than the second maximum acceleration; and
the first platooning order comprises the first vehicle following the second vehicle.

16. The electronic device of claim 13, the instructions further causing the one or more processors to:
receive third vehicle data related to a third vehicle, the third vehicle data comprising a third maximum acceleration for the third vehicle;

determine, based at least in part on the first maximum acceleration, the second maximum acceleration, and the third maximum acceleration, a second platooning order for the first vehicle, the second vehicle, and the third vehicle; and send a second signal to the first vehicle, the second vehicle, and the third vehicle, the second signal comprising the second platooning order and configured to cause the first vehicle, the second vehicle, and the third vehicle to form a second platoon based at least in part on the second platooning order.

17. The electronic device of claim 16, wherein:

the third maximum acceleration is higher than the second maximum acceleration;

the second maximum acceleration is higher than the first maximum acceleration; and the second platooning order comprises the first vehicle first in the second platoon, the second vehicle second in the second platoon, and the third vehicle third in the second platoon.

18. The electronic device of claim 17, the instructions further causing the one or more processors to:

receive a second signal from the first vehicle indicating the first vehicle is braking; and send a third signal to the second vehicle and the third vehicle, the third signal configured to cause the second vehicle and the third vehicle to brake.

19. The electronic device of claim 13, the instructions further causing the one or more processors to:

determine that the first maximum acceleration is lower than the second maximum acceleration, wherein the first platooning order comprises the second vehicle following the first vehicle, and wherein the first signal is configured to cause the second vehicle to set the second maximum acceleration equal to the first maximum acceleration.

20. The electronic device of claim 19, wherein the first vehicle comprises cargo and the second vehicle is empty.

* * * * *